US012627800B2

(12) United States Patent
Ouedraogo et al.

(10) Patent No.: US 12,627,800 B2
(45) Date of Patent: *May 12, 2026

(54) METHOD AND APPARATUS FOR ENCODING AND DECODING A VIDEO STREAM WITH SUBPICTURES

(71) Applicant: CANON KABUSHIKI KAISHA, Tokyo (JP)

(72) Inventors: Naël Ouedraogo, Val d'Anast (FR); Franck Denoual, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 10 days.

This patent is subject to a terminal disclaimer.

(21) Appl. No.: 18/829,691

(22) Filed: Sep. 10, 2024

(65) Prior Publication Data

US 2025/0008097 A1     Jan. 2, 2025

Related U.S. Application Data

(63) Continuation of application No. 17/642,535, filed as application No. PCT/EP2020/074912 on Sep. 7, 2020, now Pat. No. 12,113,971.

(30) Foreign Application Priority Data

| Sep. 17, 2019 | (GB) | ..................................... | 1913403 |
| Sep. 27, 2019 | (GB) | ..................................... | 1913976 |
| Dec. 17, 2019 | (GB) | ..................................... | 1918661 |

(51) Int. Cl.
*H04N 19/117* (2014.01)
*H04N 19/176* (2014.01)
*H04N 19/46* (2014.01)
*H04N 19/70* (2014.01)

(52) U.S. Cl.
CPC ......... *H04N 19/117* (2014.11); *H04N 19/176* (2014.11); *H04N 19/46* (2014.11); *H04N 19/70* (2014.11)

(58) Field of Classification Search
None
See application file for complete search history.

(56) References Cited

U.S. PATENT DOCUMENTS

| 2017/0195680 | A1* | 7/2017 | Yamamoto | ........... H04N 19/105 |
| 2019/0356909 | A1* | 11/2019 | Lainema | .............. H04N 19/105 |
| 2020/0177922 | A1* | 6/2020 | Chujoh | .................. H04N 19/70 |
| 2021/0176491 | A1* | 6/2021 | Wu | ...................... H04N 19/184 |

(Continued)

OTHER PUBLICATIONS

Bross et al., "Versatile Video Coding (Draft 5)," JVET-N1001-v7, 14th Meeting: Geneva, CH, Mar. 19-27, 2019.*

(Continued)

*Primary Examiner* — Michael J Hess
(74) *Attorney, Agent, or Firm* — Canon U.S.A., Inc. IP Division

(57) ABSTRACT

An encoding method comprising the encoding of information allowing the decoder to infer the splitting of CTBs located at the right, respectively the bottom of a subpicture, which width, respectively height, is not a multiple of the size of the CTBs, when the subpicture is not located at the right, respectively the bottom, of the image. Corresponding decoding methods for the generated bitstream are also proposed.

20 Claims, 14 Drawing Sheets

(56)                References Cited

U.S. PATENT DOCUMENTS

| 2022/0078436 A1* | 3/2022 | Kim | H04N 19/176 |
| 2022/0174304 A1* | 6/2022 | Boyce | H04N 19/46 |

OTHER PUBLICATIONS

Hannuksela, "AHG12: Summary of HLS proposals on subpictures," JVET-P0693, 16th Meeting: Geneva, CH, Oct. 1-11, 2019 (uploaded Sep. 30, 2019).*

Choi et al., "AHG12: Sub-picture-level conformance window," JVET-P0494, 16th Meeting: Geneva, CH, Oct. 1-11, 2019 (uploaded Sep. 26, 2019).*

Jang et al., "AHG17/Non-CE5: on loop filter processing for subpicture treated as a picture," JVET-P0246, 16th Meeting: Geneva, CH, Oct. 1-11, 2019 (uploaded Sep. 24, 2019).*

Wang et al., "AHG12: Sub-picture based motion-constrained independent regions," JVET-O0141-v2, 15th Meeting: Gothernburg, SE, Jul. 3-12, 2019.*

Wan et al., "AHG12/AHG17: Subpicture Properties," JVET-P0245-v1, 16th Meeting: Geneva, CH, Oct. 1-11, 2019 (uploaded Sep. 25, 2019).*

Chen et al., "AHG17/AHG12: On signalling the subpicture IDs," JVET-P0141-v1, 16th Meeting: Geneva, CH, Oct. 1-11, 2019 (uploaded Sep. 24, 2019).*

* cited by examiner

601 Splitting the picture into sub-pictures

602 Determine sub-picture size

603 Encode sub-picture width and height, with if required, an information on the need of inferred splitting 604 Encode sub-picture slices

701

Determine subpicture size

702

Decode slices of the subpictures

703

Generate output frame

Fig. 8

METHOD AND APPARATUS FOR ENCODING AND DECODING A VIDEO STREAM WITH SUBPICTURES

CROSS REFERENCE TO RELATED APPLICATION

This application is a Continuation application of U.S. patent application Ser. No. 17/642,535, filed on Mar. 11, 2022, which is the National Phase application of PCT Application No. PCT/EP2020/074912, filed on Sep. 7, 2020 and entitled "METHOD AND APPARATUS FOR ENCODING AND DECODING A VIDEO STREAM WITH SUBPICTURES". This application claims the benefit under 35 U.S.C. § 119(a)-(d) of United Kingdom Patent Application No. 1913403.0, filed on Sep. 17, 2019, United Kingdom Patent Application No. 1913976.5, filed on Sep. 27, 2019, and United Kingdom Patent Application No. 1918661.8, filed on Dec. 17, 2019. The above-cited patent applications are incorporated herein by reference in their entirety.

BACKGROUND OF THE INVENTION

The present disclosure concerns a method and a device for encoding and decoding a video bitstream that facilitates the displacement of subpictures. It concerns more particularly the encoding and decoding of a video bitstream resulting of the merging of subpictures coming from different video bitstreams.

The size of an image in a video bitstream may not correspond to a multiple of the size of the coding tree blocks (CTBs) used in the encoding process. The CTBs may be split recursively at encoding, in particular to find the coding block size that optimize the encoding process. Accordingly, a CTB may be divided until the smallest coding block size. When the size of the image is not a multiple of the size of the CTB, the right or bottom boundary of the image crosses the rightmost, or bottommost CTBs. In this case, an inferred split of the CTBs is provided. The coding blocks falling outside the image are typically not encoded.

When considering the division of the image into subpicture, the rightmost or bottommost subpicture may contain incomplete CTBs subject to an inferred splitting comprising some not-encoded coding blocks.

The decoder is provided in the bitstream with the size of the image in pixels, and the size of the CTBs. Accordingly, the decoder may determine the exact location of the right and bottom boundary of the image and execute the inferred splitting of the rightmost and bottommost CTBs in the image.

When considering the displacement of a subpicture located at the right or bottom boundary of the image elsewhere in the image, as the size of the subpicture is provided as an integer number of CTBs, the decoder cannot infer the splitting of the rightmost or bottommost CTBs and the identification of the missing coding blocks. The decoding fails.

The present invention has been devised to address one or more of the foregoing concerns. It is proposed an encoding method comprising the encoding of information allowing the decoder to infer the splitting of CTBs located at the right, respectively the bottom of a subpicture, which width, respectively height, is not a multiple of the size of the CTBs, when the subpicture is not located at the right, respectively the bottom, of the image. Corresponding decoding methods for the generated bitstream are also proposed.

BRIEF SUMMARY OF THE INVENTION

According to an aspect of the invention, it is provided a method of encoding video data comprising pictures into a bitstream, pictures being divided into subpictures, the method comprising for at least one subpicture:
  encoding in the bitstream an information indicating that the picture has a size that is a multiple of the size of the coding tree block and that the subpicture is independently decodable;
  encoding the coding tree blocks composing the subpicture into the bitstream.

In an embodiment, the information is related to all the subpictures.

In an embodiment, the information is defined in a sequence parameter set, the sequence parameter set being a syntax structure containing syntax elements that apply to pictures of the bitstream.

In an embodiment, subpictures are further identified with a subpicture identifier.

In an embodiment, defining the subpicture identifiers in a picture header is prohibited.

In an embodiment, subpicture identifiers defined in picture parameter sets must be identical in all the picture parameter sets.

In an embodiment, the information is associated with a particular profile.

According to another aspect of the invention, it is provided a method of encoding video data comprising pictures into a bitstream, pictures being divided into subpictures, the method comprising for at least one subpicture:
  encoding in the bitstream an information indicating a conformance window for the subpicture;
  encoding the coding tree blocks composing the subpicture into the bitstream.

In an embodiment, the information indicating a conformance window is defined in a SEI message.

In an embodiment, the information defines for the subpicture a left offset, a right offset, a top offset, and a bottom offset.

According to another aspect of the invention, it is provided a method of encoding video data comprising pictures into a bitstream, pictures being divided into subpictures, the method comprising for at least one subpicture:
  encoding in the bitstream a first information indicating that the subpicture has a size that is a multiple of the size of the coding tree block and that the subpicture is independently decodable;
  encoding in the bitstream a second information indicating a conformance window for the subpicture;
  encoding the coding tree blocks composing the subpicture into the bitstream.

According to another aspect of the invention, it is provided a computer program product for a programmable apparatus, the computer program product comprising a sequence of instructions for implementing a method according to the invention, when loaded into and executed by the programmable apparatus.

According to another aspect of the invention, it is provided a computer-readable storage medium storing instructions of a computer program for implementing a method according to the invention.

According to another aspect of the invention, it is provided a computer program which upon execution causes the method of the invention to be performed.

According to another aspect of the invention, it is provided a device for encoding video data comprising pictures into a bitstream, pictures being divided into subpictures, the device comprising a processor configured to execute for at least one subpicture:

encoding in the bitstream an information indicating that the subpicture has a size that is a multiple of the size of the coding tree block and that the subpicture is independently decodable;

encoding the coding tree blocks composing the subpicture into the bitstream.

According to another aspect of the invention, it is provided a device for encoding video data comprising pictures into a bitstream, pictures being divided into subpictures, the device comprising a processor configured to execute for at least one subpicture:

encoding in the bitstream an information indicating a conformance window for the subpicture;

encoding the coding tree blocks composing the subpicture into the bitstream.

According to another aspect of the invention, it is provided a device for encoding video data comprising pictures into a bitstream, pictures being divided into subpictures, the device comprising a processor configured to execute for at least one subpicture:

encoding in the bitstream a first information indicating that the subpicture has a size that is a multiple of the size of the coding tree block and that the subpicture is independently decodable;

encoding in the bitstream a second information indicating a conformance window for the subpicture;

encoding the coding tree blocks composing the subpicture into the bitstream.

At least parts of the methods according to the invention may be computer implemented. Accordingly, the present invention may take the form of an entirely hardware embodiment, an entirely software embodiment (including firmware, resident software, microcode, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer-readable code for provision to a programmable apparatus on any suitable carrier medium. A tangible, non-transitory carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g., a microwave or RF signal.

BRIEF DESCRIPTION OF THE DRAWINGS

Embodiments of the invention will now be described, by way of example only, and with reference to the following drawings in which:

FIG. 8 illustrates the decoding process of the CTBs encoded in a slice;

DETAILED DESCRIPTION OF THE INVENTION

Figures 1A, 1B:
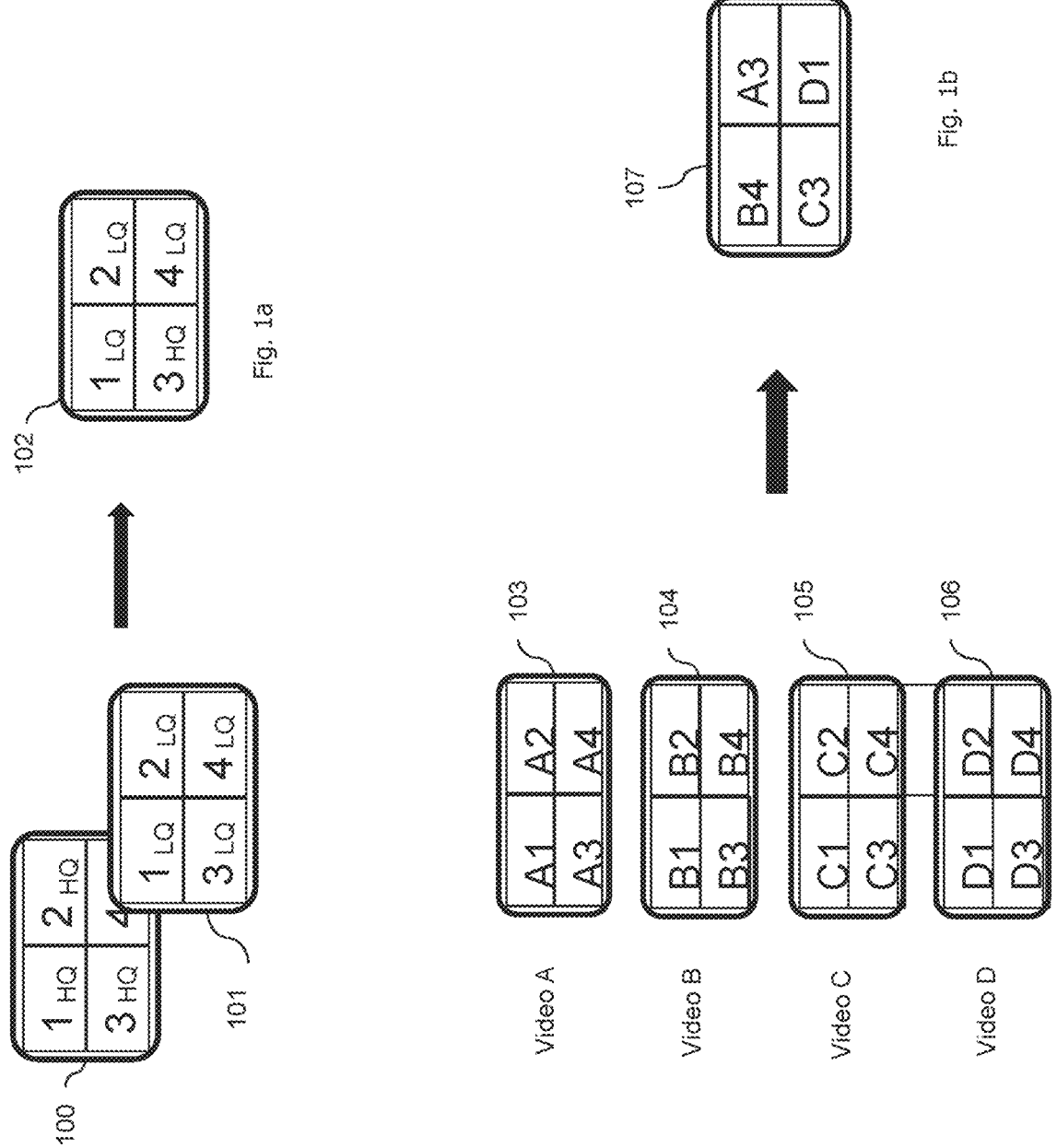
FIGS. 1a and 1b illustrate two different application examples for the combination of regions of interest.

FIGS. 1a and 1b illustrate two different application examples for the combination of regions of interest.

For instance, FIG. 1a illustrates an example where a picture (or frame) 100 from a first video bitstream and a picture 101 from a second video bitstream are merged into a picture 102 of the resulting bitstream. Each picture is composed of four regions of interest numbered from 1 to 4. The picture 100 has been encoded using encoding parameters resulting in a high quality encoding. The picture 101 has been encoded using encoding parameters resulting in a low quality encoding. As well known, the picture encoded with a low quality is associated with a lower bitrate than the picture encoded with a high quality. The resulting picture 102 combines the regions of interest 1, 2 and 4 from the picture 101, thus encoded with a low quality, with the region of interest 3 from picture 100 encoded with a high quality. The goal of such combination is generally to get a region of interest, here the region 3, in high quality, while keeping the resulting bitrate reasonable by having regions 1, 2 and 4 encoded in low quality. Such kind of scenario may happen in particular in the context of omnidirectional content allowing a higher quality for the content actually visible while the remaining parts have a lower quality.

FIG. 1b illustrates a second example where four different videos A, B, C and D are merged to form a resulting video. A picture 103 of video A is composed of regions of interest A1, A2, A3, and A4. A picture 104 of video B is composed of regions of interest B1, B2, B3, and B4. A picture 105 of video C is composed of regions of interest C1, C2, C3, and C4. A picture 106 of video D is composed of regions of interest D1, D2, D3, and D4. The picture 107 of the resulting video is composed by regions B4, A3, C3, and D1. In this example, the resulting video is a mosaic video of different regions of interest of each original video stream. The regions of interest of the original video streams are rearranged and combined in a new location of the resulting video stream.

The compression of video relies on block-based video coding in most coding systems like HEVC, standing for High Efficiency Video Coding, or the emerging VVC, standing for Versatile Video Coding, standard. In these encoding systems, a video is composed of a sequence of frames or pictures or images or samples which may be displayed at several different times. In the case of multilayered video (for example scalable, stereo, 3D videos), several pictures may be decoded to compose the resulting image to display at one instant. A picture can also be composed of different image components. For instance, for encoding the luminance, the chrominance or depth information.

Figure 2A:
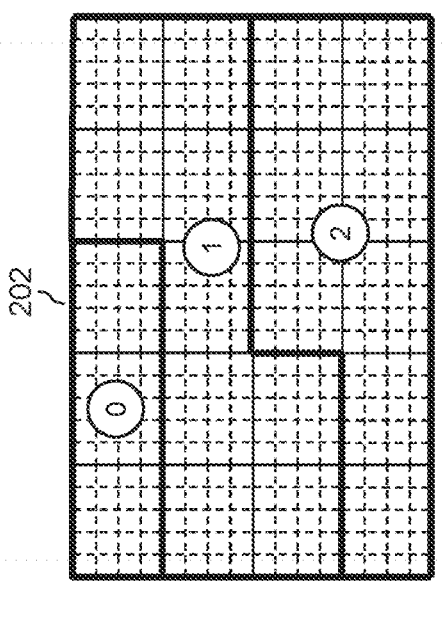
FIG. 2a illustrates some partitioning in encoding systems.
Figure 2A:
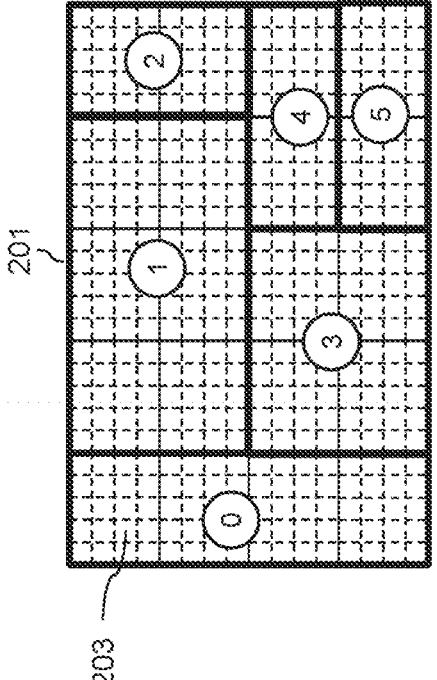

The compression of a video sequence relies on several partitioning techniques for each picture. FIG. 2a illustrates some partitioning in encoding systems. The pictures 201 and 202 are divided in coded tree units (CTU) illustrated by the dotted lines. A CTU is the elementary unit of encoding and decoding. For example, the CTU can encode an area of 128 by 128 pixels.

A Coding Tree Unit (CTU) could also be named block, macro block, coding block. It can encode simultaneously the different image components or it can be limited to only one image component. When the images contain several components, a CTU corresponds to CTB one for each component. In the following, the invention applies both at CTU or CTB level.

As illustrated by FIG. 2a, the picture can be partitioned according to a grid of tiles, illustrated by the thin solid lines. The tiles are picture parts, thus rectangular regions of pixels that may be defined independently of the CTU partitioning. The boundaries of tiles and the boundaries of the CTU may be different. A tile may also correspond to a sequence of CTUs, as in the represented example, meaning that the boundaries of tiles and CTUs coincide.

Tiles definition provides that tile boundaries break the spatial encoding dependencies. This means that encoding of a CTU in a tile is not based on pixel data from another tile in the picture.

Some encoding systems, like for example VVC, provide the notion of slices. This mechanism allows the partitioning of the picture into one or several groups of tiles. Each slice is composed by one or several tiles. Two different kinds of slices are provided as illustrated by pictures 201 and 202. A first kind of slice is restricted to slices forming a rectangular area in the picture. Picture 201 illustrates the portioning of a picture into five different rectangular slices. A second kind of slices is restricted to successive tiles in raster scan order. Picture 202 illustrates the partitioning of a picture into three different slices composed of successive tiles in raster scan order. Rectangular slice is a structure of choice for dealing with regions of interest in a video. A slice can be encoded in the bitstream as one or several NAL units. A NAL unit, standing for a Network Abstraction Layer unit, is a logical unit of data for the encapsulation of data in the encoded bitstream. In the example of VVC encoding system, a slice is encoded as a single NAL unit. When a slice is encoded in the bistream as several NAL units, each NAL unit of the slice is a slice segment. A slice segment includes a slice segment header that contains the coding parameters of the slice segment. The header of the first segment NAL unit of the slice contains all the coding parameters of the slice. The slice segment header of the subsequent NAL unit of the slice may contain fewer parameters than the first NAL units. In such a case, the first slice segment is an independent slice segment and the subsequent segments are dependent slice segments.

In OMAF v2 ISO/IEC 23090-2, a sub picture is a portion of a picture that represents a spatial subset of the original video content, which has been split into spatial subsets before video encoding at the content production side. A sub picture is for example one or more slices forming a rectangular region.

Figure 2B:
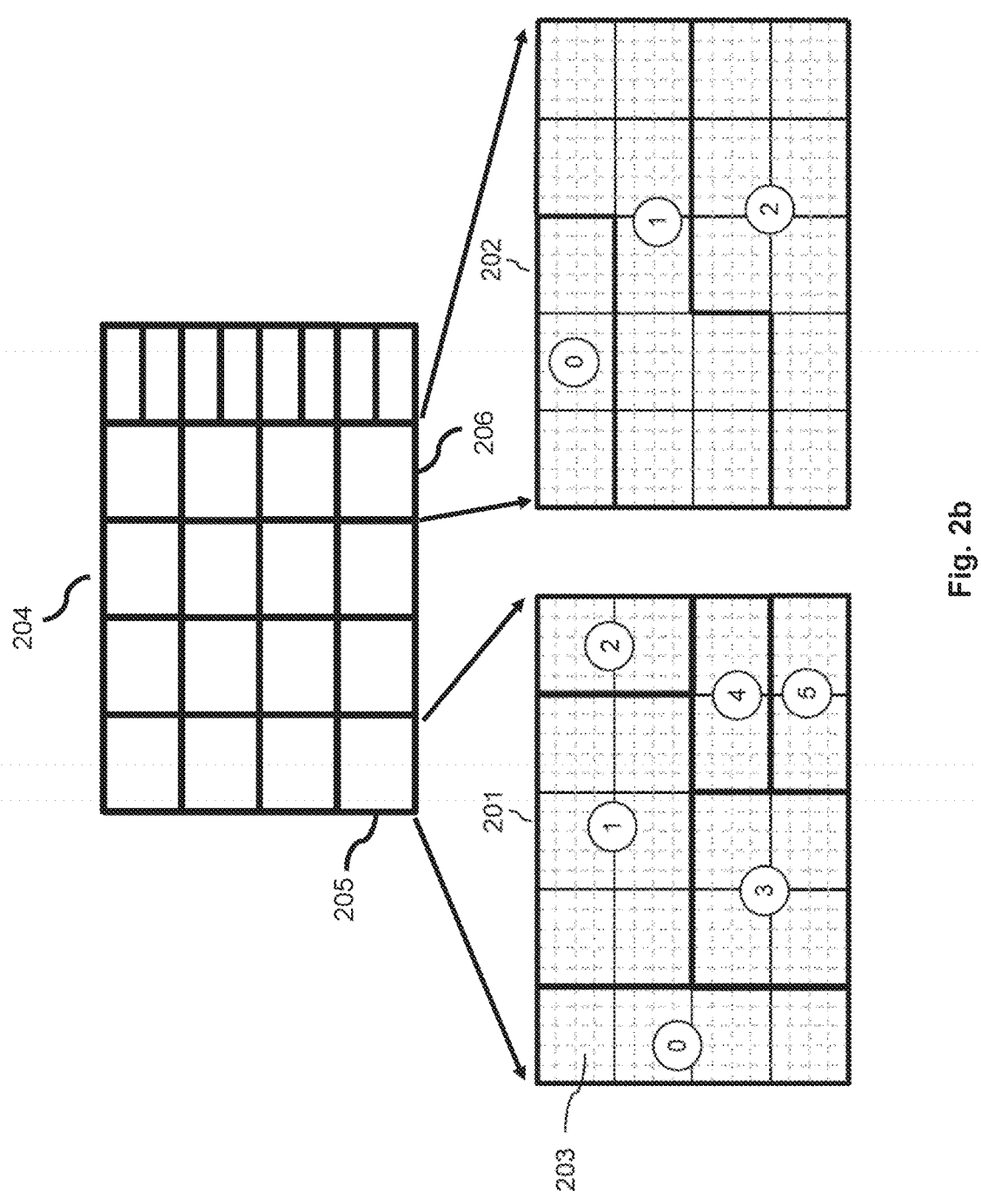
FIG. 2b illustrates an example of partitioning of a picture in sub pictures.

FIG. 2b illustrates an example of partitioning of a picture in sub pictures. A sub picture represents a picture portion that covers a rectangular region of a picture. Each sub picture may have different sizes and coding parameters. For instance, different tile grids and slices partitioning may be defined for each sub picture. In FIG. 2b, the picture 204 is subdivided in 24 sub pictures including the sub pictures 205 and 206. These two sub pictures further describe a tile grid and a partitioning in slice similar to the pictures 201 and 202 of FIG. 2a. In a second example, the tile and brick partitioning are not defined per subpicture but rather at picture level. The subpicture are then defined as one or more slices forming a rectangular region.

Figure 2C:
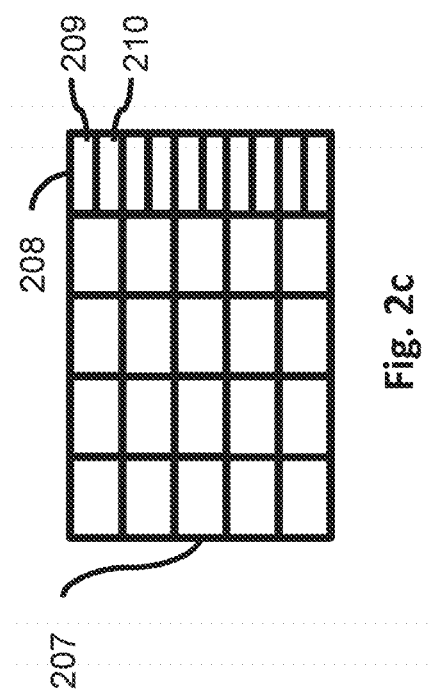
FIG. 2c illustrates an example of partitioning of a picture in tiles and bricks.

FIG. 2c illustrates an example of partitioning using brick partitioning. Each tile may comprise a set of bricks. A brick is a contiguous set of CTUs forming one line in the tile. For example, the frame 207 of FIG. 2c is divided into 25 tiles. Each tile contains exactly one brick except the ones in the rightmost column of tiles that contain two bricks per tile. For instance, the tile 208 contains two bricks 209 and 210. When brick partitioning is employed, the slice contains either bricks from one tile or several bricks from other tiles. In other words, the VCL NAL units are a set of bricks instead of a set of tiles.

Figure 3:
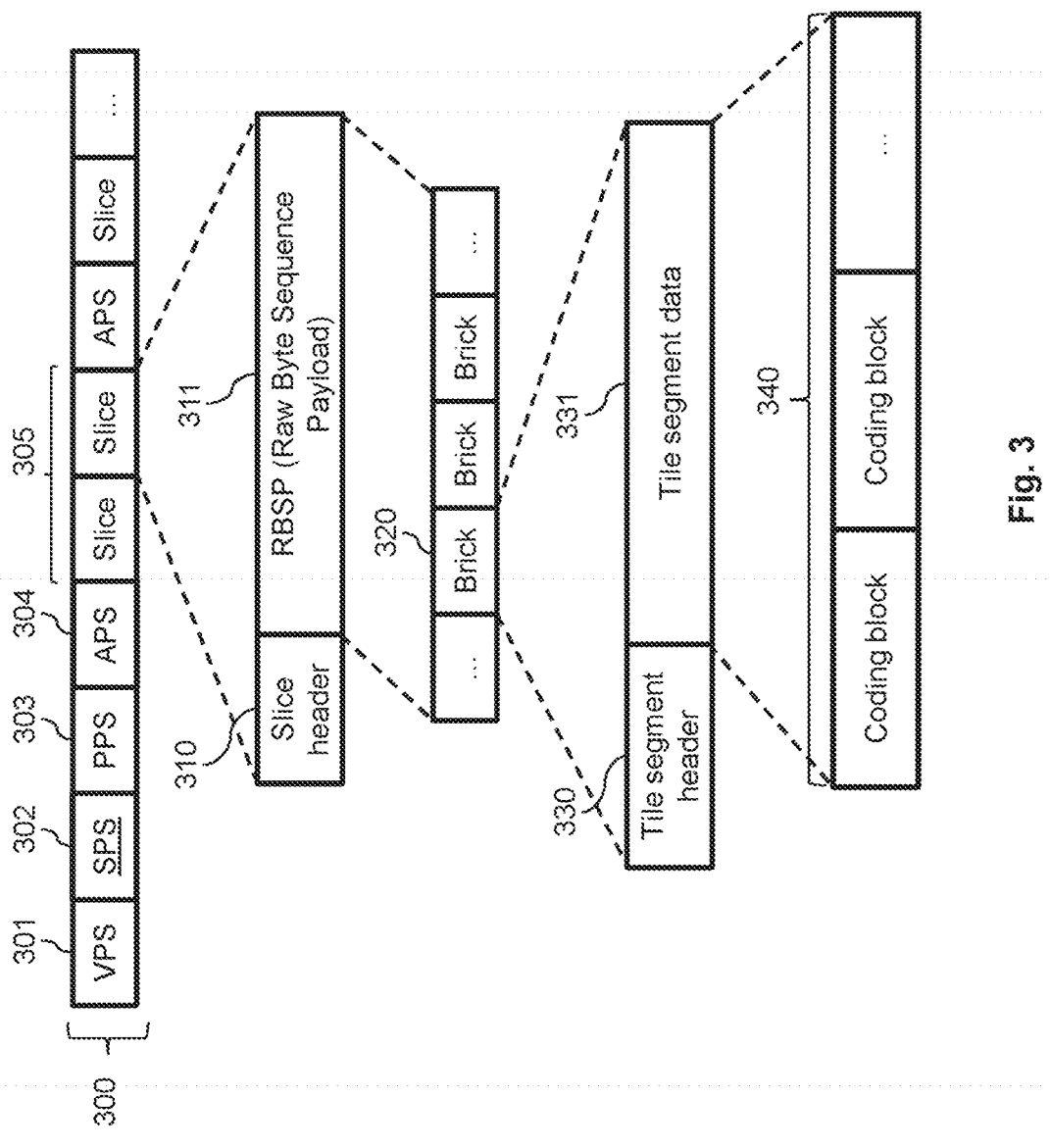
FIG. 3 illustrates the organisation of the bitstream in the exemplary coding system VVC.

FIG. 3 illustrates the organisation of the bitstream in the exemplary coding system VVC.

A bitstream 300 according to the VVC coding system is composed of an ordered sequence of syntax elements and coded data. The syntax elements and coded data are placed into NAL units 301-305. There are different NAL unit types. The network abstraction layer provides the ability to encapsulate the bitstream into different protocols, like RTP/IP, standing for Real Time Protocol/Internet Protocol, ISO Base Media File Format, etc. The network abstraction layer also provides a framework for packet loss resilience.

NAL units are divided into VCL NAL units and non-VCL NAL units, VCL standing for Video Coding Layer. The VCL NAL units contain the actual encoded video data. The non-VCL NAL units contain additional information. This additional information may be parameters needed for the decoding of the encoded video data or supplemental data that may enhance usability of the decoded video data. NAL units 305 correspond to slices and constitute the VCL NAL units of the bitstream. Different NAL units 301-304 correspond to different parameter sets, these NAL units are non-VCL NAL units. The VPS NAL unit 301, VPS standing for Video Parameter Set, contains parameters defined for the whole video, and thus the whole bitstream. The naming of VPS may change and for instance becomes DPS in VVC. In an alternative, the VPS and DPS are different Parameter Sets NAL Units. The DPS (that stands for Decoder Parameter Set) NAL unit may define parameters more static than the parameters in the VPS. In other words, the parameters of DPS change less frequently than the parameter of the VPS. The SPS NAL unit 302, SPS standing for Sequence Parameter Set, contains parameters defined for a video sequence. In particular, the SPS NAL unit may define the sub pictures of the video sequences. The syntax of the SPS contains for example the following syntax elements:

| | Descriptor |
|---|---|
| seq_parameter_set_rbsp( ) { | |
|    sps_decoding_parameter_set_id | u(4) |
|    sps_video_parameter_set_id | u(4) |
| [...] | |
|    pic_width_max_in_luma_samples | ue(v) |
|    pic_height_max_in_luma_samples | ue(v) |
|    subpics_present_flag | u(1) |
|    if( subpics_present_flag ) { | |
|      max_subpics_minus1 | u(8) |
|      subpic_grid_col_width_minus1 | u(v) |
|      subpic_grid_row_height_minus1 | u(v) |
|      for( i = 0; i < NumSubPicGridRows; i++ ) | |
|        for( j = 0; j < NumSubPicGridCols; j++ ) | |
|          subpic_grid_idx[ i ][ j ] | u(v) |
|      for( i = 0; i <= NumSubPics; i++ ) { | |
|        subpic_treated_as_pic_flag[ i ] | u(1) |
|        loop_filter_across_subpic_enabled_flag[ i ] | u(1) |
|      } | |
|    } | |
| [...] | |

The descriptor column gives the encoding of a syntax element, u(1) means that the syntax element is encoded using one bit, ue(v) means that the syntax element is encoded using unsigned integer 0-th order Exp-Golomb-coded syntax element with the left bit first that is a variable length encoding.

The presence of subpictures in the picture depends on the value of subpics_present_flag. When this flag is equal to 0, it indicates the picture does not contain subpicture. When equal to 1, a set of syntax elements specifies the subpictures in a frame. The syntax element max_subpics_minus1 specifies the maximum number of sub pictures in a picture of the video sequence. Then, the SPS defines the subpictures partitioning with a grid of subpicture grid elements of size defined by subpic_grid_col_width_minus1 and subpic_grid_ row_height_minus1. Each grid element specifies subpic_grid_idx[i][j] (wherein i and j are the coordinate of the element in the grid) which is an index of subpicture. There are as many subpic_grid_idx[i][j] values as sub pictures in the picture of the video sequence. The subpic_grid_idx[i][j] syntax element is an identifier of subpicture. All grid elements that share the same index value form a rectangular region corresponding to the subpicture of index (or identifier) equal to the index value. The subpic_treated_as_pic_flag[i] syntax element indicates whether the sub picture boundaries should be treated as picture boundaries except for the loop filtering process. The loop_filter_across_subpic_enabled_flag[i] syntax element states if the loop filter are applied across the subpicture boundaries.

The PPS NAL unit 303, PPS standing for Picture Parameter Set, contains parameters defined for a picture or a group of pictures. The APS NAL unit 304, APS standing for Adaptation Parameter Set, contains parameters for loop filters typically the Adaptive Loop Filter (ALF) or the reshaper model (or luma mapping with chroma scaling model) that are defined at the slice level. The bitstream may also contain SEI, standing for Supplemental Enhancement Information, NAL units. The periodicity of occurrence of these parameter sets in the bitstream is variable. A VPS that is defined for the whole bitstream needs to occur only once in the bitstream. At the opposite, an APS that is defined for a slice may occur once for each slice in each picture. Actually, different slices may rely on the same APS and thus there are generally fewer APS than slices in each picture. When a picture is divided into sub pictures, a new Parameter Set or the PPS may be defined for each sub picture or a group of sub pictures.

The VCL NAL units 305 contain each a slice. A slice may correspond to the whole picture or sub picture, a single tile or a plurality of tiles or a single brick or a plurality of bricks. A slice is composed of a slice header 310 and a raw byte sequence payload, RBSP 311 that contains the bricks.

The syntax of the PPS as proposed in the current version of VVC comprises syntax element that specifies the size of the picture and luma sample and also the partitioning of each picture in tiles, bricks and slices.

The syntax of the PPS as proposed in the current version of VVC is organised as follows:

| | Descriptor |
|---|---|
| pic_parameter_set_rbsp( ) { | |
|    pps_pic_parameter_set_id | ue(v) |
|    pps_seq_parameter_set_id | ue(v) |
|    pic_width_in_luma_samples | ue(v) |
|    pic_height_in_luma_samples | ue(v) |
|    [...] // Additional syntax elements not represented | |
|    single_tile_in_pic_flag | u(1) |
|    if( !single_tile_in_pic_flag ) { | |
|      [Tile partitioning] | |
|      brick_splitting_present_flag | u(1) |
|      [...] // Additional syntax elements not represented | |
|      for( i = 0; brick_splitting_present_flag && i <= | |
|      num_tiles_in_pic_minus1 + 1; i++ ) { | |
|        [Brick partitioning ] | |
|      } | |
|    single_brick_per_slice_flag | u(1) |
|    if( !single_brick_per_slice_flag ) | |
|      rect_slice_flag | u(1) |
|    if( rect_slice_flag && !single_brick_per_slice_flag ) | |
|    { | |
|      num_slices_in_pic_minus1 | ue(v) |
|      [...] | |
|      for( i = 0; i < num_slices_in_pic_minus1; i++ ) { | |
|        [ Syntax element describing slice location] | |
|      } | |
|    } | |
|    [...] // Additional syntax elements not represented | |
|    } | |
|    if( rect_ slice_flag ) { | |
|      signalled_slice_id_flag | u(1) |
|      if( signalled_ slice_id_flag ) { | |
|        signalled_ slice_id_length_minus1 | ue(v) |
|        for( i = 0;i <= num_ slices_in_pic_minus1; i++ ) | |
|          slice_id[ i ] | u(v) |
|    } | |
|    [...] // Additional syntax elements not represented | |
|    rbsp_trailing_bits( ) | |
| } | |

The descriptor column gives the encoding of a syntax element, u(1) means that the syntax element is encoded using one bit, ue(v) means that the syntax element is encoded using unsigned integer 0-th order Exp-Golomb-coded syntax element with the left bit first that is a variable length encoding. The syntax elements pic_width_in_luma_samples and pic_height_in_luma_samples specify the width and the height of the picture in luma samples.

When the number of tiles in the picture is greater than one (single_tile_in_pic_flag equals 0), the PPS defines several syntax elements (not represented in the table above) that specify the tile partitioning in the frame as a grid of tiles.

When bricks are present (brick_splitting_present_flag equals to 1), the PPS contains a loop over each tile of the tile grid to indicate whether the tile is divided into bricks. When a tile contains bricks, the brick configuration of the tile is encoded in the PPS.

The slice partitioning is expressed with the following syntax elements:

The syntax element single_tile_in_pic_flag states whether the picture contains a single tile. In other words, there is only one tile and one slice in the picture when this flag is true.

single_brick_per_slice_flag states whether each slice con-
tains a single brick. In other words, all the bricks of the
picture belong to a different slice when this flag is true.

The syntax element rect_slice_flag indicates that slices of
the pictures form a rectangular shape as represented in the
picture 201.

When present, the syntax element num_slices_in_pic_mi-
nus1 is equal to the number of rectangular slices in the
picture minus one.

Then, syntax elements (not represented in the table above)
encodes the location of each slice relatively to the brick
partitioning in a 'for loop' over all the slices of the picture.
The index of the slice location parameters in this for loop is
the index of the slice.

The slice identifiers are specified when the signalled_sli-
ce_id_flag is equal to 1. In this case, the signalled_slice_id_
length_minus1 syntax element indicates the number of bits
used to code each slice identifier value. The slice_id[ ]
association table is indexed by slice index and contains the
identifier of the slice. When the signalled_slice_id_flag is
equal to 0, the slice_id is indexed by slice index and contains
the slice index of the slice.

To sum up the PPS contains syntax elements that make it
possible to determine the slices location in a frame. Since the
subpicture form a rectangular region in the frame, it is
possible to determine the set of slices, tiles and bricks that
belong to a subpicture.

The slice header comprises the slice address according to
the following syntax in the current VVC version:

| | Descriptor |
| --- | --- |
| slice_header( ) { | |
| slice_pic_parameter_set_id | ue(v) |
| if( rect_ slice flag \| \| NumTilesInPic > 1 ) | |
| slice_address | u(v) |
| if( !rect_ slice_flag && !single_tile_per_ slice_flag ) | |
| num_tiles_in_ slice_minus1 | ue(v) |
| [...] | |

When the slice is not rectangular, the slice header indi-
cates the number of tiles in the slice NAL unit with help of
num_tiles_in_slice_minus1 syntax element.

Each tile 320 may comprise a tile segment header 330 and
a tile segment data 331. The tile segment data 331 comprises
the encoded coding blocks 340. In current version of the
VVC standard, the tile segment header is not present and tile
segment data contains the coding block data 340.

In a variant, the video sequence includes sub pictures; the
syntax of the slice header may be the following:

| | Descriptor |
| --- | --- |
| slice_header( ) { | |
| slice_pic_parameter_set_id | ue(v) |
| slice_subpic_id | u(v) |
| if( rect_ slice_flag \| \| NumTilesInSubPic > 1 ) | |
| slice_address | u(v) |
| [..] | |

The slice header includes the slice_subpic_id syntax
element which specifies the identifier (e.g., corresponding to
one of the values of subpic_grid_idx[i][j] defined in the
SPS) of the sub pictures it belongs to. As a result, all the
slices that share the same slice_sub_pic_id in the video
sequence belong to the same sub picture.

Figure 4:
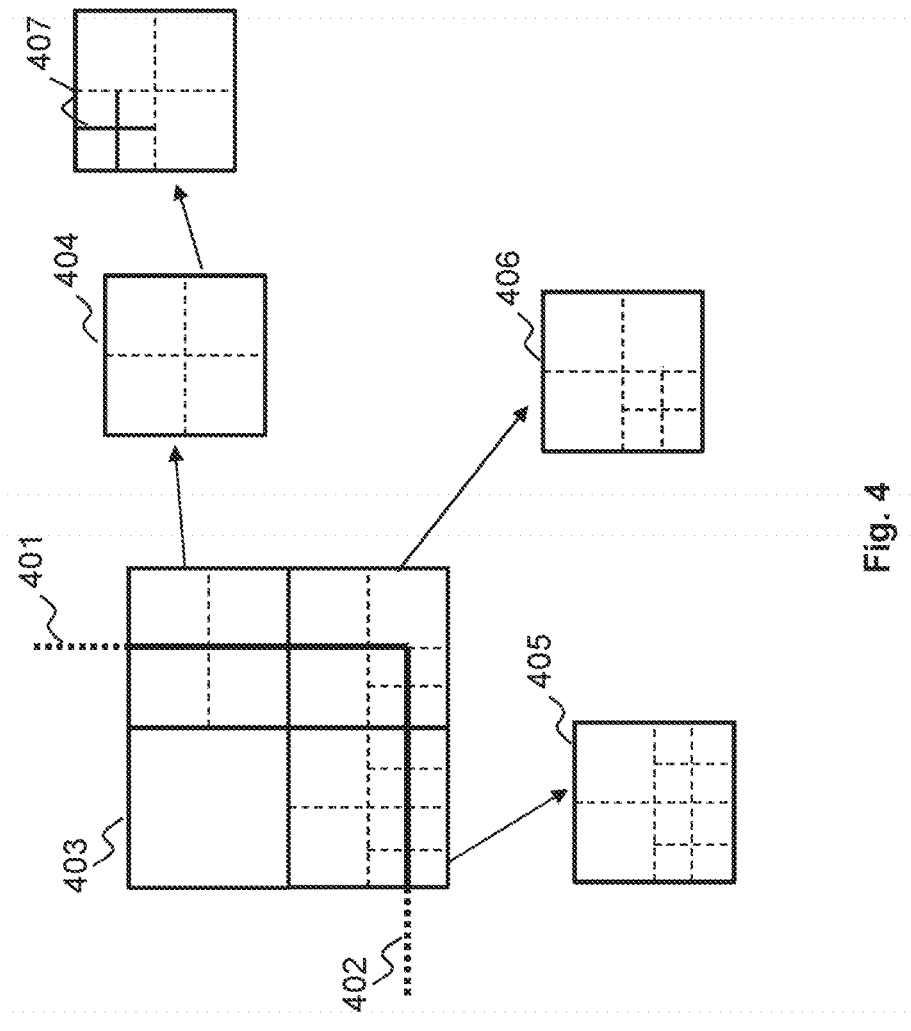
FIG. 4 schematically illustrates the quad-tree inference mechanism used in VVC for coding tree blocks that are crossing the boundaries of the image.

FIG. 4 schematically illustrates the quad-tree inference
mechanism used in VVC for coding tree blocks that are
crossing the boundaries of the image, for illustration purpose
only. In VVC, images are not restricted to have a width and
a height multiple of the coding tree block size. Then, the
rightmost coding tree blocks of the frame may cross the right
boundary 401 of the image, and the bottom most coding tree
blocks of the frame may cross the bottom boundary 402 of
the image. In those cases, VVC defines a quad-tree inference
mechanism for the coding tree blocks crossing the bound-
aries. This mechanism consists in recursively splitting any
coding block of the coding tree block that is crossing the
image boundary, until there is no more coding block cross-
ing the boundary, or until the maximum quad-tree depth is
reached for these coding tree blocks. For instance, the
coding tree block 403 is not automatically split, while
coding tree blocks 404, 405 and 406 are. There is no
signalling of the inferred quad-tree: a decoder must infer the
same quad-tree on image boundaries. However the auto-
matically obtained quad-tree may be further refined for the
coding tree blocks that are inside the frame by signalling
splitting information for these coding tree blocks (if the
maximum quad-tree depth is not reached), as in 407 for
instance.

When splitting a CTB into coding blocks, there is a
smallest coding block which cannot be split. The size of this
smallest coding block, which is square, is given by MinCB-
SizeY. In some example, MinCBSizeY is equal to 4.

At encoding, coding blocks of the coding tree block
located outside the image are typically not encoded in the
bitstream. At decoding, the decoder uses the same quad-tree
inference mechanism and knows that these coding blocks
are not encoded. The decoder is able to decode the other
coding blocks, those falling in the image, that have been
encoded in the bitstream. The obtained coding tree is
encoded in the bitstream by the encoder. The decoder relies
on this encoded coding tree information to correctly identify
the blocks to decode and reconstruct the image. In particular,
the encoded coding tree contains a parameter, e.g., called
split_cu_flag, that specifies whether a coding unit is split or
not.

Figures 5A, 5B:
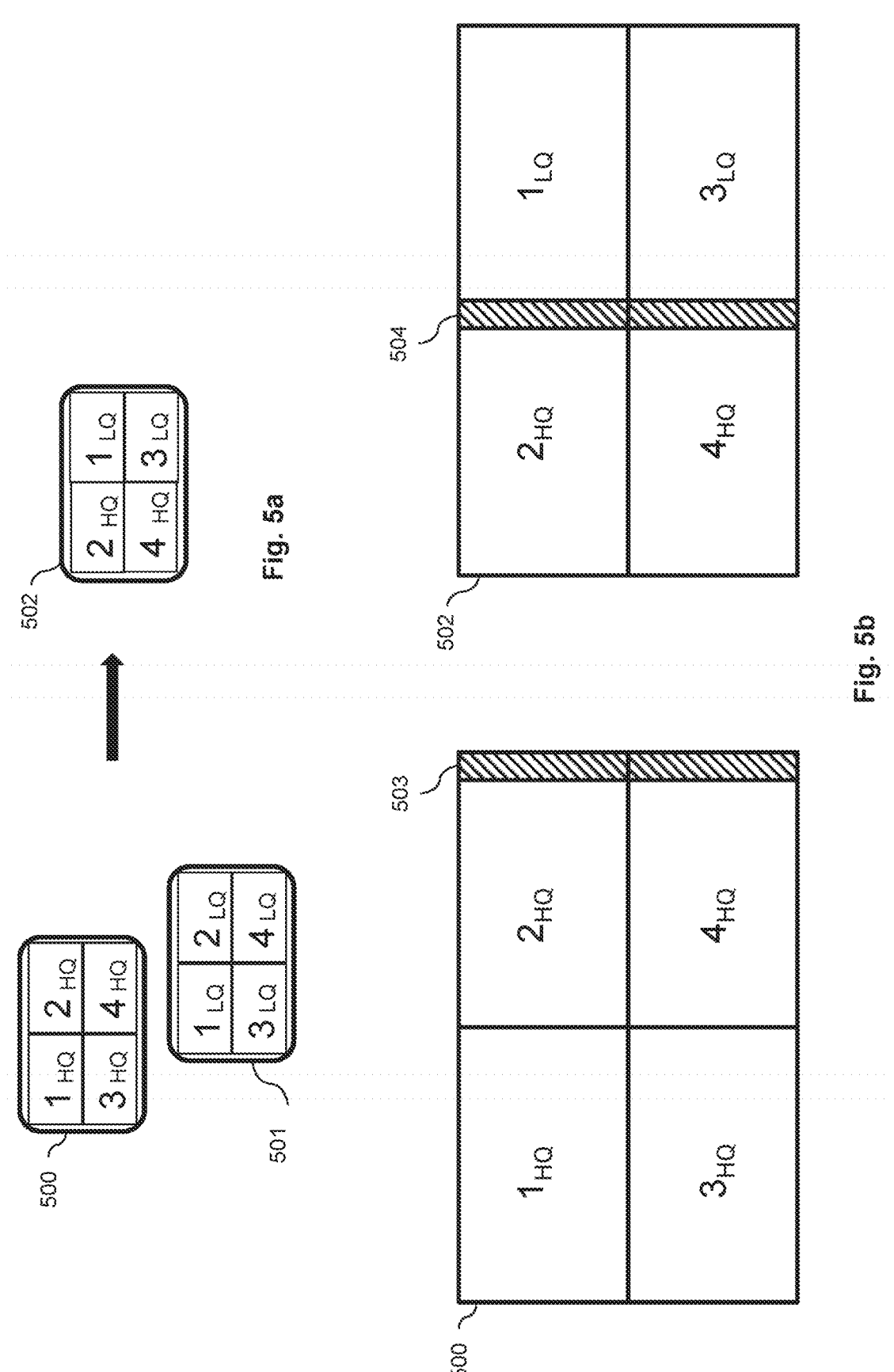
FIGS. 5a and 5b illustrate the creation of a bitstream where boundary subpictures are moved to non-boundary locations.

FIGS. 5a and 5b illustrate the creation of a bitstream
where boundary subpictures are moved to non-boundary
locations.

In this example, a first bitstream 500 is composed by 4
subpictures $1_{HQ}$ to $4_{HQ}$. This bitstream represents a high-
quality version of a video. A second bitstream 501 is
composed by 4 subpictures $1_{LQ}$ to $4_{LQ}$. This bitstream
represents a low-quality version of the same video. The
bitstream 502 is created by merging and rearranging some
subpictures issued from bitstream 500 and 501.

In particular, bitstream 502 is composed of subpictures
$2_{HQ}$, $1_{LQ}$, $4_{HQ}$ and $3_{LQ}$, where the subpicture $2_{HQ}$ is moved
from the top right location in bitstream 500 to the top left
location in bitstream 502, the subpicture $4_{HQ}$ is moved from
the bottom right location in bitstream 500 to the bottom left
location in bitstream 502, the subpicture $1_{LQ}$ is moved from
the top left location in bitstream 501 to the top right location
in bitstream 502, the subpicture $3_{LQ}$ is moved from the
bottom left location in bitstream 501 to the bottom right
location in bitstream 502.

The bitstream 500, as illustrated in FIG. 5b, is composed
of images having a width that is not a multiple of the coding
tree block (CTB) size. Accordingly, the rightmost coding
tree blocks are subject to be inferred splitting. The rightmost
coding blocks in these CTBs are not encoded in the bit-
stream. These not encoded coding blocks are represented by the hatched part 503. In the bitstream 502, the non-encoded coding blocks 504 are located at the right boundary of the subpictures $2_{HQ}$ and $4_{HQ}$, in the middle of the image.

The size in pixels (or luma samples) of the image is coded in the bitstream. This information allows the decoder to know the boundary of the image and deduce the inferred splitting of the rightmost CTBs in the image. Then the decoder knows the coding blocks that are not encoded and is able to decode the coding blocks composing the image.

When a subpicture like the subpicture $2_{HQ}$ and $4_{HQ}$ are moved from the rightmost part of the image elsewhere like in the bitstream 502, a problem occurs. The size of the subpictures is encoded in the bitstream as an integer number of CTBs. Due to this particularity in the standard, it is not possible for the decoder to infer the right boundary of the subpicture and the corresponding inferred splitting of the rightmost CTBs of the subpicture. The decoder expects all the coding blocks of the rightmost CTBs of the subpicture to be encoded in the bitstream. As some of them are missing, the decoding fails.

There is a need to find a way of rearranging sub pictures in an image without re-encoding them.

This problem may be solved by proposing an encoding method comprising the encoding of information allowing the decoder to infer the splitting of CTBs located at the right, respectively the bottom of a subpicture, which width, respectively height, is not a multiple of the size of the CTBs, when the subpicture is not located at the right, respectively the bottom, of the image. Corresponding decoding methods for the generated bitstream are also proposed.

A subpicture is a rectangular region in a picture represented by one or more slice. The subpicture are defined for example in the SPS or the PPS NAL unit. The encoder may indicate for each subpicture that their boundaries are treated as picture boundaries, which means that the subpicture can be decoded independently of each other. The intra and inter prediction processes are constrained to use prediction information only from the same subpicture in current and reference frames. The filtering of the subpicture boundaries is controlled by a flag defined for each subpicture. This flag makes it possible to apply the loop filter at the boundaries of the subpicture or not. When decoding a CTB from one slice, the decoder determines the index or identifier of the subpicture the CTB belongs to.

In the following, the usage of subpicture is to allow to decode regions of a video sequence at different locations and also potentially to move the subpicture at new decoding location. For this reason, in the preferred embodiment the subpicture boundaries are treated as picture boundaries (since it ensures motion prediction is constrained to allow independent decoding of the subpicture) and loop filters are disabled at the subpictures boundaries. For VVC, these two conditions are met when the flag subpic_treated_as_pic_flag [i] and loop_filter_across_subpic_enabled_flag[i] flag are respectively equal to 1 and 0 for the subpictures. For HEVC, a subpicture is for example a set of slices which belongs to a Motion Constrained Tile Set as per HEVC specification.

Figure 6:
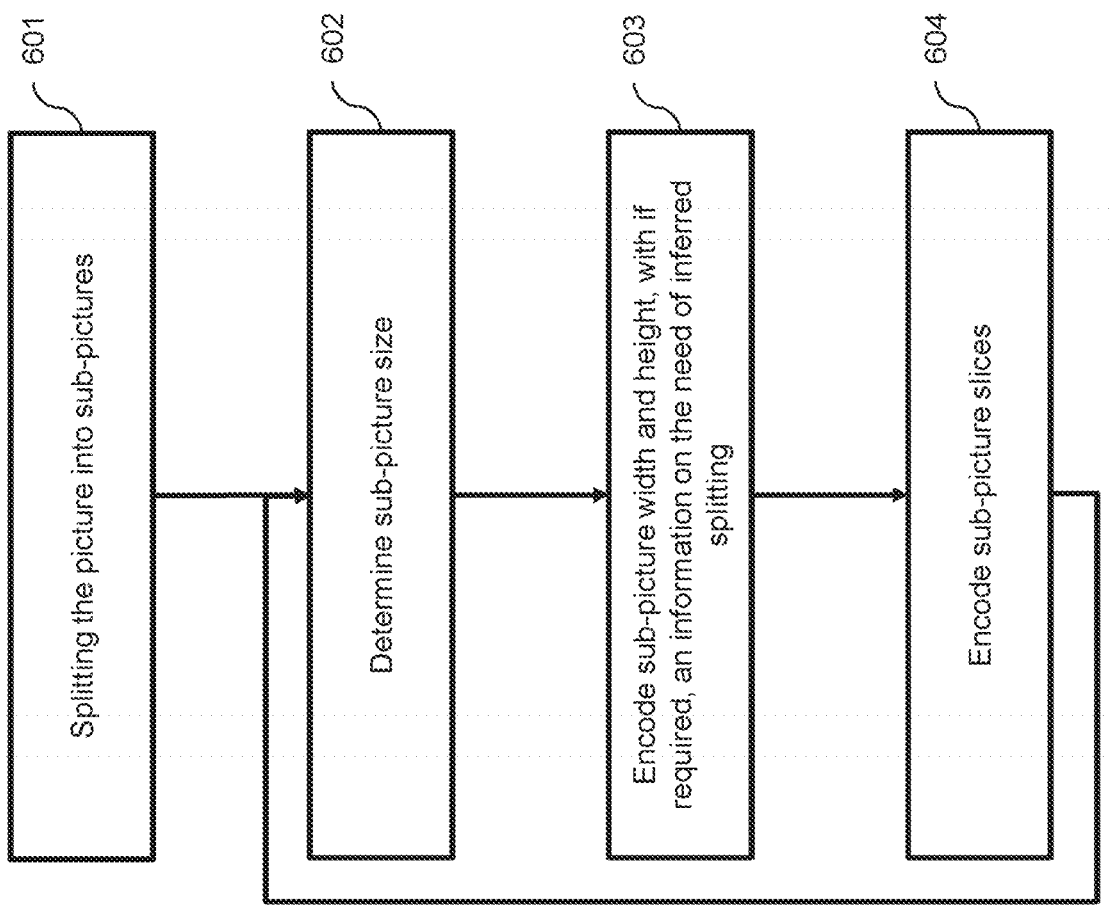
FIG. 6 illustrates an encoding method a picture of a video into the bitstream according to a first aspect of the invention.

FIG. 6 illustrates an encoding method a picture of a video into the bitstream according to a first aspect of the invention.

In a first step 601, the picture is divided into subpictures.

In a step 602, the size of the subpicture is determined. The width and height of each subpicture are a function of the region of interests present in the input video sequence. Typically, the size of each subpicture is made to contain one region of interest. The size of the subpicture is determined in pixels (or luma samples). When the size of the subpicture is not a multiple of the size of the CTBs, it is determined that a specific split inference process is required for the subpicture. In particular, it may happen when an encoder merges two bitstreams as represented in FIG. 5a.

In a step 603, the size of the subpicture is encoded in the bitstream. This size is an information indicating the location of splitting inference boundary/ies for the subpicture when splitting inference process is required. If required, an information indicating the need for a split inference process for this subpicture is encoded in the bitstream. The information provided in the bitstream at this step allows the decoder to perform the splitting inference process.

In a step 604, the at least one slice composing the subpicture is encoded in the bitstream. When a splitting inference process is required, the encoder divides the subpictures into two parts. First part is the area between the top and left boundaries of the subpicture and the horizontal and the vertical split inference boundaries. The second part is the area between the split inference boundaries and the bottom and right boundaries of the subpicture. For instance, the white area in the subpicture of 2HQ of FIG. 5b corresponds to the first part, and the hatched area to the second part. In this document, we refer to the first part of the subpicture as useful part of the subpicture. The coding units falling outside the useful part of the subpicture according to this splitting inference process are not encoded.

In an alternative embodiment, the coding blocks falling outside the useful part of the subpicture are encoded with padding data.

In another alternative embodiment, a flag is inserted in the bitstream to indicate if the coding blocks falling outside the useful part of the subpicture are encoded with padding data or not encoded. Typically, the encoder specifies in the Picture Parameter Sets NAL units that a subpicture contains coded coding blocks with padded data for the coding units falling outside the useful part of the subpicture. For instance, a flag is associated with each subpicture identifier to specify whether padded coding data is provided for the coding units outside the useful part of the subpicture.

In some embodiments, the use of split inference process for each tile may be known from the context of the bitstream. In these embodiments, there is no need to encode a flag to signal the use of the split inference process for the subpictures.

It is proposed to introduce new syntax elements in one parameter set NAL unit, for example in the SPS, that make possible to obtain the same splitting inference for CTBs at the right and/or bottom boundaries of one subpicture when moved at different positions in a merged bitstream.

These syntax elements would make possible for a decoder to determine the size of skipped coding blocks in last CTB row/or last CTB column of the subpicture when the subpicture boundaries are treated as picture boundaries.

As a result, when moving a subpicture from rightmost position in a picture to another position, the merge or encoding operation consists in determining the size of the skipped coding blocks in last CTB row and column and then in specifying it in the SPS associated with the subpicture, for example. The decoding of the merged bitstream would use these values to determine the usable size of the subpicture.

For example, the syntax of the SPS includes the syntax elements as follows:

| | Descriptor |
|---|---|
| seq_parameter_set_rbsp( ) { | |
| [...] | |
| subpics_present_flag | u(1) |
| if( subpics_present_flag ) { | |
|   max_subpics_minus1 | u(8) |
|   subpic_grid_col_width_minus1 | u(v) |
|   subpic_grid_row_height_minus1 | u(v) |
|   subpic_split_inference_flag | u(1) |
|   for( i = 0; i < NumSubPicGridRows; i++ ) | |
|     for( j = 0; j < NumSubPicGridCols; j++ ) | |
|       subpic_grid_idx[ i ][ j ] | u(v) |
|   for( i = 0; i <= NumSubPics; i++ ) { | |
|     subpic_treated_as_pic_flag[ i ] | u(1) |
|     if( subpic_split_inference_flag && | |
|     subpic_treated_as_pic_flag[ i ] ) { | |
|       subpic_split_inference_ctb_width[ i ] | u(v) |
|       subpic_split_inference_ctb_height[ i ] | u(v) |
|     } | |
|     loop_filter_across_subpic_enabled_flag[ i ] | u(1) |
|   } | |
| } | |

According to the proposed embodiment, some new syntax elements have been introduced represented in bold in the table. The semantics of these new syntax elements may be the following.

subpic_split_inference_flag equal to 1 indicates that the last CTB row or the last CTB column of a subpicture is not complete. An inference processing for the split of the CTB of the last CTB row and column of a subpicture takes in account the usable size of the subpicture to determine the value of split_cu_flag.

subpic_split_inference_flag equal to 0 indicates that all the CTBs of the subpicture are complete. No split inference process is required for the CTBs on the last CTB row and column of the subpictures.

subpic_split_inference_ctb_width[i] specifies the actual width (i.e., the width of pixels of the CTB in the useful part of the i-th subpicture) of the CTB in the rightmost column of CTBs of the i-th subpicture when present. The value of subpic_split_inference_ctb_width[i] is specified in units of coding blocks of MinCbSizeY width and may be in the range of [0, CtbSizeY/MinCbSizeY−1], inclusive. When not present, the value of subpic_split_inference_ctb_width[i] is inferred to be equal to CtbSizeY/MinCbSizeY which corresponds to the width of a CTB. This coding syntax element is coded for instance using a fix length code of 7 bits or equal to log2(CtbSizeY/MinCbSizeY−1,). It is also possible to use an Exp-Golomb code.

subpic_split_inference_ctb_height[i] specifies the actual height of the CTB in the last row of CTBs of the i-th subpicture when present. The value of subpic_split_inference_ctb_height[i] is specified in units of coding blocks of MinCbSizeY height and may be in the range of [0, CtbSizeY/MinCbSizeY−1], inclusive. When not present, the value of subpic_split_inference_ctb_height[i] is inferred to be equal to CtbSizeY/MinCbSizeY which corresponds to the height of a CTB. This coding syntax element is coded for instance using a fix length code of 7 bits or equal to log2(CtbSizeY/MinCbSizeY−1,). It is also possible to use an Exp-Golomb code.

The subpic_split_inference_flag makes possible for an encoder to indicate to a decoder that a specific process is required to handle the CTBs of the last CTB row and column of some subpictures. It means that the rightmost and/or bottom CTB row includes coding blocks that the encoder has not encoded. The split of these CTBs into blocks is handled by a coding tree splitting process that can infer the split of each block as function of the value of subpic_split_inference_ctb_width[i] and subpic_split_inference_ctb_height[i] syntax elements for the i-th subpicture.

The actual size of the rightmost and bottom CTBs in the i-th subpicture (specified by subpic_split_inference_ctb_width[i] and subpic_split_inference_ctb_height[i]) is in units of the minimal coding block size (MinCbSizeY, MinCbSizeY) as specified in the SPS. The actual size of the CTB cannot exceed the maximum size of the coding tree block as specified in the SPS (CtbSizeY, CtbSizeY). As a result, the range of subpic_split_inference_ctb_height and subpic_split_inference_ctb_width is 0 to the ratio of the maximum size of the CTB and the minimal size of coding blocks, minus one.

In one alternative, the subpic_split_inference_ctb_width[i] and subpic_split_inference_ctb_height[i] are expressed in units of several luma samples (typically four luma samples) to simplify the parsing of SPS. Indeed, the size of the CTB and the minimal size of the coding blocks is specified in the SPS and may be defined after the subpic_split_inference_ctb_width[i] and subpic_split_inference_ctb_height[i] syntax element. In this case, the locations of the splitting inference boundaries are expressed as an integer multiple of the size of the smallest coding block for a coding tree block. In addition, when subpic_split_inference_ctb_width[i] and subpic_split_inference_ctb_height[i] is defined in a different Parameter Set NAL unit, it makes it possible to compute the actual size of each subpicture independently of the CTB and coding block sizes.

The pseudo-code below determines boundaries in the i-th subpicture that trigger the split of the coding tree. The location of the vertical boundary is represented by the variable SubPicRightSplitInferenceBoundary[i] and the horizontal boundary by the SubPicBotSplitInferenceBoundary[i] variable.

The location in luma sample units of the vertical boundary in the i-th subpicture is equal to the location of the right boundary aligned on CTB boundaries of the i-th subpicture minus the subpic_split_inference_ctb_width [i] syntax element defined in SPS. The location in luma sample units of the horizontal boundary in the i-th subpicture is equal to the location of the bottom boundary aligned on CTB boundaries of the i-th subpicture minus the subpic_split_inference_ctb_height [i] syntax element defined in SPS.

The variable SubPicRightSplitInferenceBoundary[i] and SubPicBotSplitInferenceBoundary[i] are derived as follows:

```
for( i = 0; i. < NumSubPics; i++) {
        SubPicRightSplitInferenceBoundary[ i ] = (SubPicLeft [ i ] + SubPicWidth[ i ]) * (
subpic_grid_col_width_minus1 + 1 ) * 4 − CtbSizeY + subpic_split_inference_ctb_width
[ i ] * MinCbSizeY;
        SubPicBotSplitInferenceBoundary[ i ] = (SubPicTop [ i ] +SubPicHeight[ i ]) * (
subpic_grid_row_height_minus1 + 1 )* 4− CtbSizeY +
subpic_split_inference_ctb_height[ i ] * MinCbSizeY;
}
```

Accordingly, the proposed new syntax elements associated with a subpicture, subpic_split_inference_flag, subpic_split_inference_ctb_width[i], and subpic_split_inference_ctb_height[i], allow the encoder to indicate to the decoder the information it needs to be able to infer the splitting of the incomplete CTB and determine the coding block falling outside the useful part of the subpicture.

The coding tree syntax includes a flag, split_cu_flag that indicates whether the coding block is split. The split is inferred when the coding tree block is not entirely within the boundaries of the useful part of a subpicture and as a result the flag is not encoded.

split_cu_flag equal to 0 specifies that a coding block is not split. split_cu_flag equal to 1 specifies that a coding block is split into four coding blocks using a quad split as indicated by the syntax element split_qt_flag, or into two coding blocks using a binary split or into three coding blocks using a ternary split as indicated by the syntax element mtt_split_cu_binary_flag. The binary or ternary split can be either vertical or horizontal as indicated by the syntax element mtt_split_cu_vertical_flag.

When split_cu_flag is not present in the encoding of a coding block, the value of split_cu_flag is inferred as follows:

If one or more of the following conditions are true, the value of split_cu_flag is inferred to be equal to 1:

x0+cbWidth is greater than SubPicRightSplitInferenceBoundary[SubPicIdx].

y0+cbHeight is greater than SubPicBotSplitInferenceBoundary[SubPicIdx].

Otherwise, the value of split_cu_flag is inferred to be equal to 0.

The pseudo-code described above determines if the coding block located at the position (x0, y0) in luma samples coordinates with a width (resp. height) equal to cbWidth (resp. cbHeight), lies completely inside the useful part of the current subpicture of index equal to SubPicIdx. When it is outside this area, the encoder (and the decoder) infers that the coding block is split (split_cu_flag is equal to 1).

When a coding block is inferred to be split since its boundaries are outside of the useful part of the subpicture actual pixel boundaries, there are three possible splits. First one is the quad tree split i.e., the coding block is further divided into 4 squared coding blocks of equal size. The second is a split into two coding blocks separated by either a vertical or a horizontal boundary spanning the whole coding block. This split is the binary tree split. Finally, the third split is the ternary tree split which divides the coding block into three blocks either separated by vertical or horizontal boundaries.

In addition to the split inference process, the encoder (and similarly the decoder) applies a specific encoding process for the coding blocks outside the useful part of a subpicture. In a first embodiment, these coding blocks are not coded. For each split coding blocks, the encoder checks if the y-axis (respectively x-axis) coordinate of the top boundary (resp. left boundary) of the block is greater equal to the SubPicBotSplitInferenceBoundary (resp. SubPicRightSplitInferenceBoundary) value for the current subpicture. In such a case, the encoder skips the encoding of the blocks. As a result, no coded syntax element is provided for those coding blocks. As a result, when encoding neighbour coding units, these skipped coding blocks are considered as not available for the inter and intra-prediction. Similarly, the temporal prediction is restricted to avoid using the pixels information from these skipped coding blocks.

Figure 7:
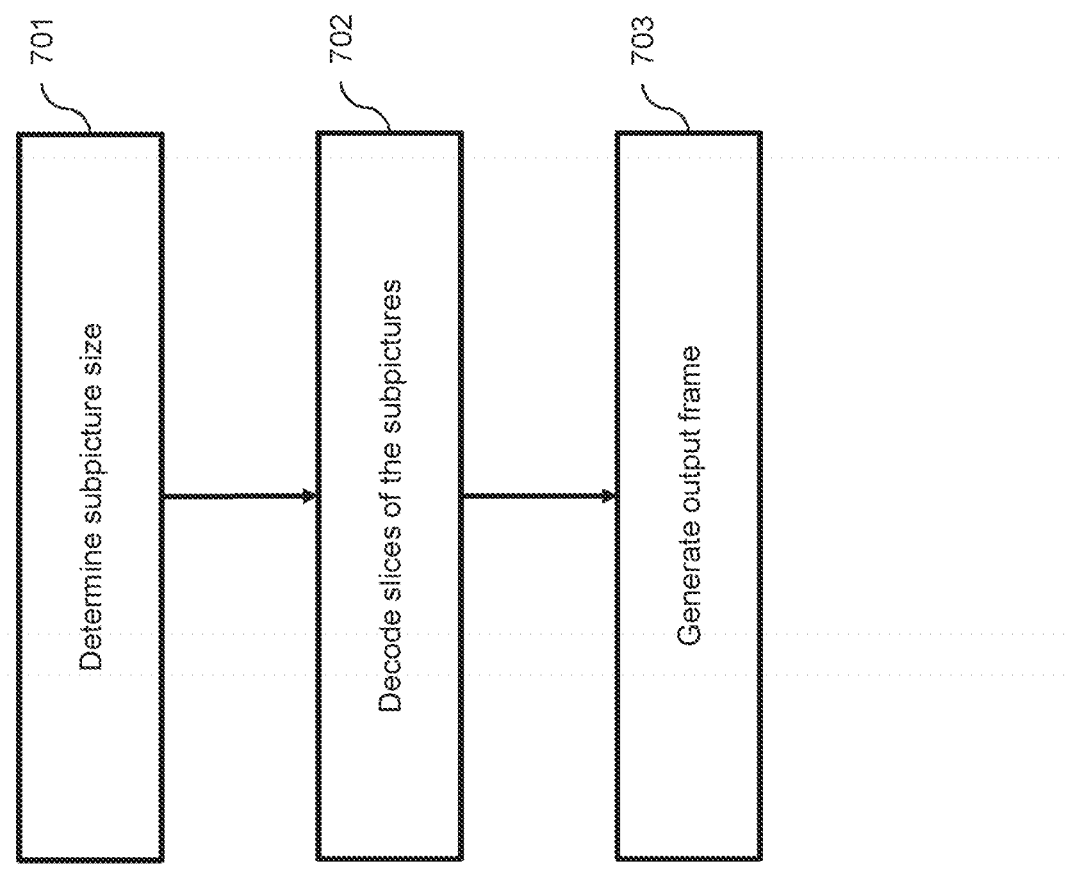
FIG. 7 illustrates the general decoding process of an embodiment of the invention.

FIG. 7 illustrates the general decoding process of an embodiment of the invention. In a step 701, the decoder determines the size of the subpictures of the frame, typically its width and height by parsing the SPS and PPS of the stream. In particular, it determines the slice NAL units that belong to each subpicture. In a step 702, the decoder decodes the slices of the subpictures forming the picture. More details are given with reference to the FIG. 8 for the decoding process of the encoded CTBs in each slice. In a step 703, consists in generating the output pictures from the decoded pictures. In particular, the decoder may optionally apply some cropping operations on the decoded subpictures.

Figure 8:
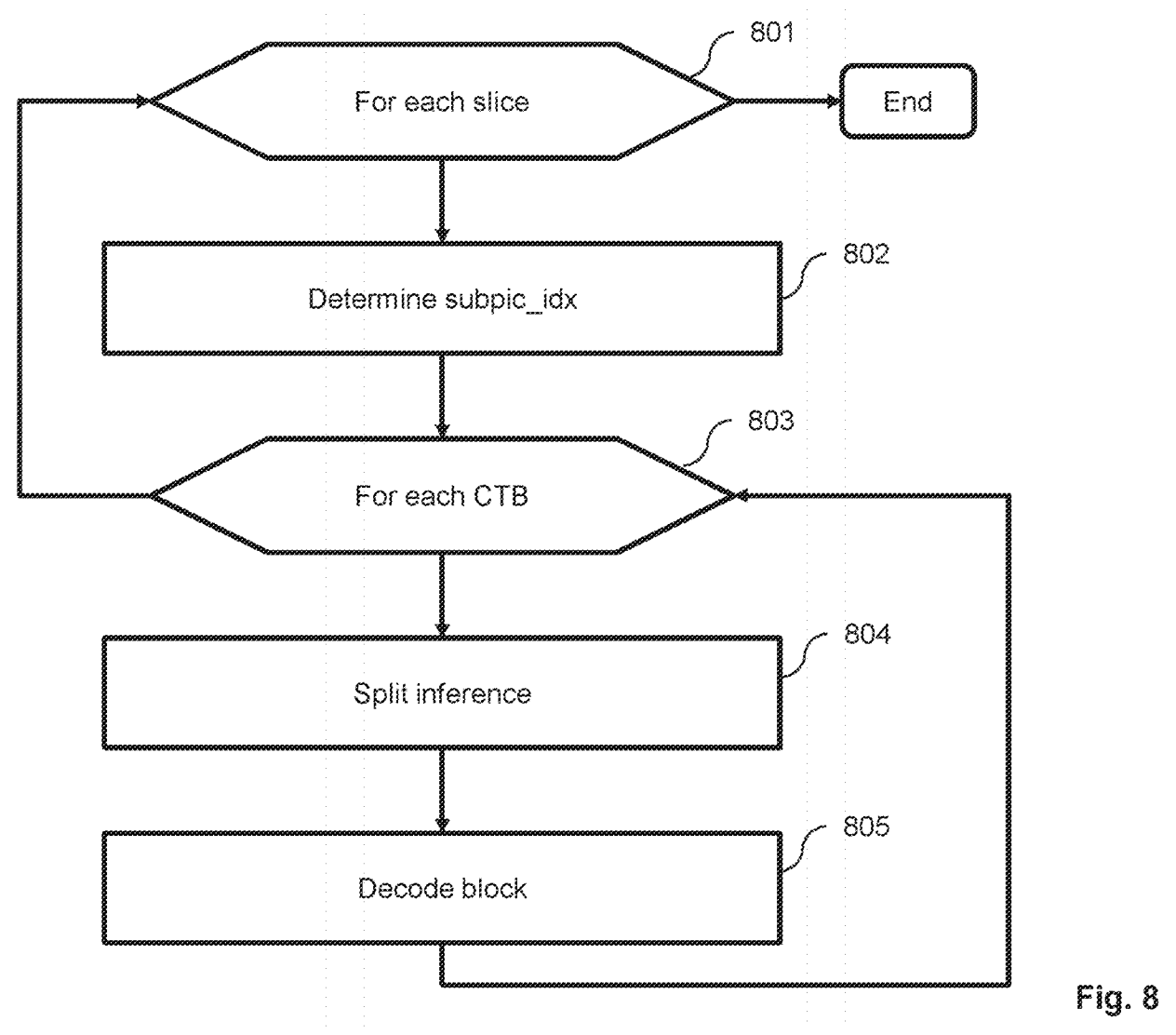

FIG. 8 illustrates the decoding process 702 of the CTBs encoded in a slice. In a step 801, it is checked if there are slices left to decode. When all slices have been decoded, the process ends. For a given slice, the decoder determines in a step 802 the identifier of the subpicture the slice belongs to.

Then, in a step 803 it is checked if there are CTBs left to decode in the current slice. For a given CTB, in a step 804, the decoder parses the syntax elements of the CTB. When the CTB is on the rightmost or bottom boundaries of the subpicture with the identifier determined in 802, the decoder applies a split inference process to the CTB if the process is required for the current slice. Then, when the CTB is split, in a step 805 the decoder decode each coding block resulting from the inference process and lying within the sub-picture. The coding blocks lying outside the useful part of the subpicture are not decoded as they are not present in the bitstream. In some embodiments, the coding blocks lying outside the useful part of the subpicture are decoded if they have been encoded with padding data.

The decoding process of subpictures results, for subpictures, which size is not a multiple of the CTBs size, in a right column or bottom row of incomplete CTBs. When arranging the subpicture to compose the final frame to render, the decoder has to determine a value for the pixels lying in these bands of pixels. An example of a band of undetermined pixels is given in FIG. 5b, namely, the band 504. This is due to the fact that subpicture within a frame are restricted to be composed of an integer number of CTBs. As a result, the subpicture contains a set of conformant decoded pixels corresponding to the area between the origin of the subpicture and the split inference boundary/ies. The remaining area corresponds to undefined or pixels values that are not intended to be displayed. In some embodiments, the decoder may set the values of the pixels in the remaining bands to zero. In some other embodiments, the decoder may set the values of the pixels in the remaining bands by duplicating the value of the nearest conformant pixel.

As these bands of undetermined pixels are not intended to be displayed, these bands may be suppressed in the resulting frame by shifting the neighbouring subpicture. For example, the subpictures $1_{LQ}$ and $3_{LQ}$ in the bitstream 502 of FIG. 5b may be shifted left by the width of the band 504.

In this embodiment, the decoder shifts the decoded pixels of the subpicture on the right and on the bottom of the current subpicture so that they align with the right and bottom inference split boundaries. The decoding location in luma samples of the coding block takes into account that some subpictures are not complete.

The decoder has all the information it needs to identify the bands of undetermined pixels. In one embodiment, the decoder proceeds to the shift of subpictures in order to eliminate these bands in a post-decoding process after decoding all the subpictures.

In another embodiment, the decoder may integrate the shifting operation in the decoding process. In this embodiment, new variables are defined by the decoder and used during the decoding of each CTB to decode the coding blocks right in their final location.

The SubPicOffsetX[i] and SubPicOffsetY[i] variables indicate respectively the offset to subtract from X-axis coordinate and Y-axis coordinate of the pixels of coding blocks of the i-th subpicture to be placed at their correct location.

For example, xCtbShifted and yCtbShifted variables are the new coordinates of the top left pixel of the CTB at the CtbAddrInRs address in raster scan order of a picture after the shifting operation.

The pseudo-code below compute these coordinates, wherein CtbAddressInRs is the raster scan address of the CTB in the picture; PicWidthInCtbsY is the width of the picture in CTB unit and CtbLog2SizeY is the log2 of the size of CTB in luma samples; SubPicIdx is the index of the subpicture which contains the current CTB.

```
xCtbShifted = ( CtbAddrInRs % PicWidthInCtbsY ) << CtbLog2SizeY
yCtbShifted = ( CtbAddrInRs / PicWidthInCtbsY ) << CtbLog2SizeY
if( subpic_split_inference_flag ) {
        xCtbShifted -= SubPicOffsetX[SubPicIdx]
        yCtbShifted -= SubPicOffsetY[SubPicIdx]
}
```

The first two lines compute the x-axis and y-axis coordinates of the origin of the coding tree block in luma sample units. These values do not take into account, the skipped pixels in neighbour subpictures if any. Then, if subpic_split_inference_flag equal to 1 which indicates that the subpictures may contain skipped blocks, the sum of the width of the skipped pixels of the subpictures located on the left (resp. top) of the coding tree block is subtracted from xCtbShifted (resp. yCtbShifted) coordinates.

The encoder determines the shift offset for x-axis (SubPicOffsetX[ i]) and y-axis (SubPicOffsetY[i]) coordinates of each SubPicture as follows. First, for a given subpicture, it determines the set of subpicture on the left of the current subpicture. For each subpicture of this set, the shifting offset is equal to the difference between the right boundary of the last CTB row and the right subpicture inference boundary. Typically, this value is equal to CtbSizeY—subpic_split_in-ferernce_ctb_width[j]*MinCbSizeY where j is the index of the subpicture in the set and CtbSizeY is the size of the CTB in luma sample or pixel units. The value of shift offset for x-axis is equal to the sum of CtbSizeY—subpic_split_infer-ernce_ctb_width[j]*MinCbSizeY for each j equal to the index of the subpicture in the set of left subpictures. Similarly, the value of the shift offset for y-axis is equal to the sum of CtbSizeY—subpic_split_inferernce_ctb_height[j] *MinCbSizeY for each j equal to the index of the subpicture in the set of top subpictures above current subpicture.

Figure 9:
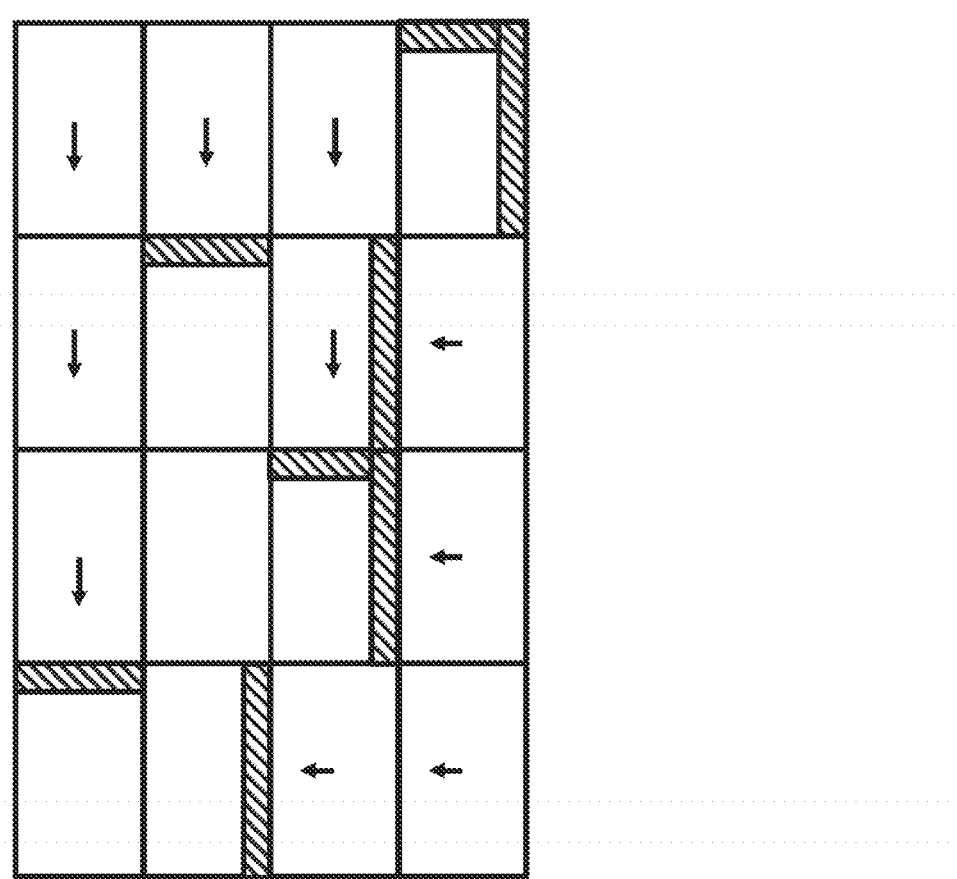
FIG. 9 illustrates an example where the picture is divided into 16 subpictures.

FIG. 9 illustrates a case where the picture is divided into 16 subpictures, where the bands of undetermined pixels are represented by hatched bands. The arrows represent the shifting of subpictures to eliminate the bands of undetermined pixels. If all the vertical bands, respectively horizontal bands, have the same size it may be understood that the resulting image is rectangular. It is also the case because each column of subpictures comprises the same number of horizontal bands and each row of subpictures comprises the same number of vertical bands.

It may be understood that if these conditions are not met, the resulting image may not be rectangular.

In one embodiment, the possibility to specify different inference boundaries for the subpictures is constrained to avoid defining a picture with non-rectangular picture shape after the shifting operation. In particular, the height (resp. width) in luma samples of each column (resp. row) of subpictures must be equal after the shift or cropping of the decoded frame.

Figure 10:
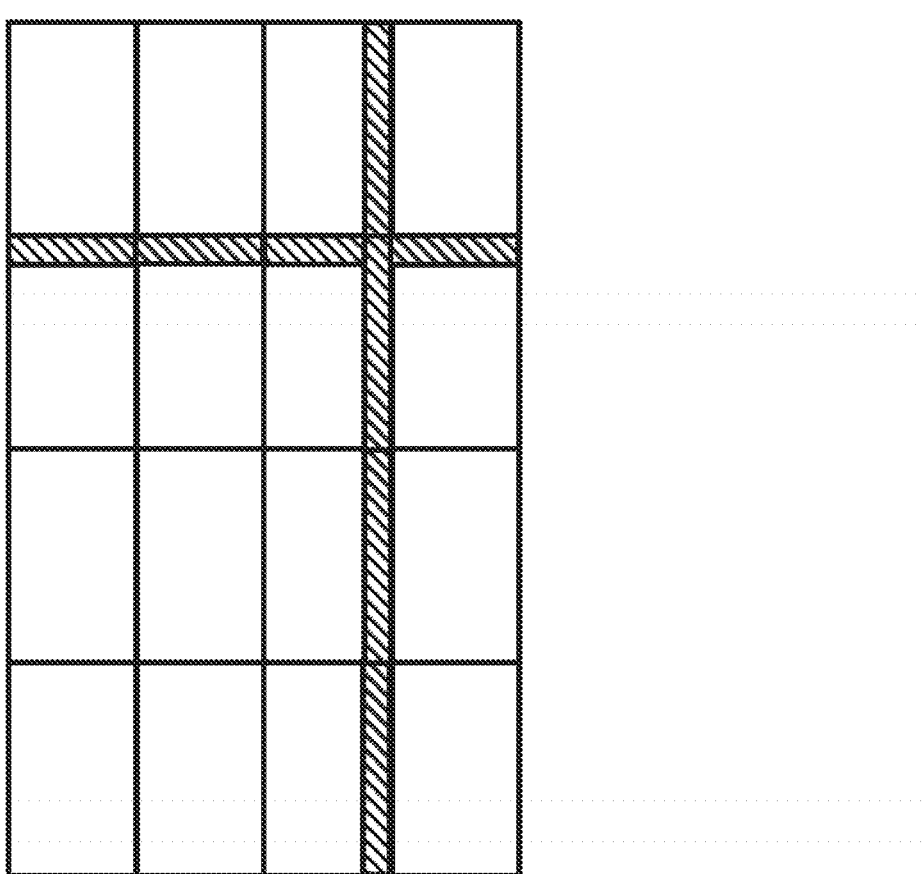
FIG. 10 illustrates an example where the picture is divided into 16 subpictures with picture-wide splitting inference boundaries.
Figure 10:

The possibility to specify different inference boundaries in a given row (or column) of subpictures may lead to complex operations to shift the decoded samples at each subpicture with different shifting offsets. For this reason, in an embodiment, it may be defined a constraint that the subpicture inference boundaries are aligned across the picture. For example, FIG. 10 illustrates a case where the picture is divided into 16 subpictures that respect this constraint.

Figure 11:
FIG. 11 illustrates the concept of picture-wide boundaries.

FIG. 11 illustrates the concept of picture-wide boundaries.

In an alternative, the encoder determines two types of boundaries for the subpicture. First, the subpicture boundaries aligned with other subpictures boundaries that collectively span over the whole picture width or height. We refer to such kind of subpicture boundaries as picture-wide boundaries. For example, the bottom boundary of the subpicture 0 in FIG. 11 is a picture-wide boundary. On the contrary, the bottom boundary of subpicture 1 is not picture-wide.

In an embodiment, the encoder constrains the subpicture arrangement such that the last CTB rows of subpictures, which have a bottom boundary which is not picture-wide, not to use the inference split. In other words, the split inference boundaries are aligned with the CTB boundaries and for example the size of subpic_split_infer-ence_ctb_height[i] is equal to the size of CTB. The same principle applies for the last CTB columns of subpictures which have a right boundary which is picture-wide. In one alternative, the encoder determines the type of the boundaries of each subpicture and encodes the value of sub-pic_split_inference_ctb_width[i] (resp. subpic_split_infer-ence_ctb_height[i]) when the right (resp. bottom) boundary of the subpicture is a picture-wide boundary. When, the right (resp. bottom) boundary is not picture-wide, the sub-pic_split_inference_ctb_width[i] (resp. subpic_split_infer-ence_ctb_height[i]) is not coded and inferred equal to the size of the CTB.

The encoder may apply a second constraint for subpictures for which the bottom (resp. right) boundaries are the same picture-wide boundary. For example, this constraint is that subpic_split_inference_height[i] are equal for all the i-th subpicture of this set of subpictures when the boundary is at the bottom of the supbictures. Similarly, the sub-pic_split_inference_width[i] may be equal for all the i-th subpictures of the set of subpictures which have a common right picture-wide boundary.

In addition, the encoder may apply a third constraint that the split inference boundary is aligned with CTB boundaries when the subpicture is not decodable independently. Typically, when either the subpic_treated_as_pic_flag[i] is equal 0 or loop_filter_across_subpic_enabled_flag[i] is equal to 1 for the i-th subpicture. This constraint ensures that the split inference mechanism is used only in context of subpicture merging. Embodiments according to these constraints will now be described.

In another embodiment, the syntax of the SPS is changed to specify the location of the vertical split inference boundary and the location of the horizontal split inference boundary that span across the whole picture. In the embodiment, as the subpicture boundaries subject to split inference concern only picture-wide boundaries, a signaling at the picture level is used.

There are several alternatives to specify the location of these boundaries. The location of the split inference boundary may be signalled in a parameter set NAL unit such as the SPS or the PPS. The parameter set should describe information that relates to subpicture and picture information.

In one alternative, the location of the inference boundary is defined for instance relatively to the origin of the picture in luma sample units.

For instance, the PPS syntax includes the following elements:

|  | Descriptor |
| --- | --- |
| picture_parameter_set_rbsp( ) { | |
| [...] | |
| pps_subpic_split_inference_flag | u(1) |
| if (pps_subpic_split_inference flag ) { | |
| pps_split_inference_boundary_pos_x | u(13) |
| pps_split_inference_boundary_pos_y | u(13) |
| } | |

Wherein:

pps_subpic_split_inference_flag is a flag indicating the use of a subpicture splitting inference. Typically, the splitting inference applies on picture-wide boundaries. pps_subpic_split_inference_flag equal to 1 indicates the presence of pps_split_inference_boundary_pos_x and pps_split_inference_boundary_pos_y; pps_subpic_split_inference_flag equal to 0 indicates the absence of pps_split_inference_boundary_pos_x and pps_split_inference_boundary_pos_y;

pps_split_inference_boundary_pos_x is used to compute the value of PpsSplitInferenceBoundaryPosX, which specifies the location of the vertical split inference boundary in units of luma samples. pps_split_inference_boundary_pos_x may be in the range of 1 to Ceil(pic_width_in_luma_samples÷4)−1, inclusive. This coding syntax element is coded for instance using a fix length code of 13 bits or equal to log2 (pic_width_in_luma_samples/4). It is also possible to use an Exp-Golomb code.

The location of the vertical split inference boundary PpsSplitInferenceBoundaryPosX is derived as follows:

PpsSplitInferenceBoundaryPosX=pps_split_inference_boundary_pos_x*4 pps_split_inference_boundary_pos_y is used to compute the value of PpsSplitInferenceBoundaryPosY, which specifies the location of the horizontal split inference boundary in units of luma samples. pps_split_inference_boundary_pos_y may be in the range of 1 to Ceil(pic_height_in_luma_samples÷4)−1, inclusive. This coding syntax element is coded for instance using a fix length code of 13 bits or equal to log2 (pic_width_in_luma_samples/4). It is also possible to use an Exp-Golomb code.

The location of the horizontal split inference boundary PpsSplitInferenceBoundaryPosY is derived as follows:

psSplitInferenceBoundaryPosY=pps_split_inference_boundary_pos_y*4

The coding tree split inference process compares the coding unit boundaries with the location of the split inference boundaries. For example, the split of the coding unit is inferred when the right boundary or the bottom boundary of a coding block is greater than one of the split inference boundary that crosses the current subpicture. As a result the split inference of split_cu_flag is for example the following:

When split_cu_flag is not present, the value of split_cu_flag is inferred as follows:

If one or more of the following conditions are true, the value of split_cu_flag is inferred to be equal to 1:

x0+cbWidth is greater than PpsSplitInferenceBoundaryPosX and (SubPicLeft[SubPicIdx])*(subpic_grid_col_width_minus1+1)*4)<PpsSplitInferenceBoundaryPosX and (SubPicLeft[SubPicIdx]+SubPicWidth[i])*(subpic_grid_col_width_minus1+1)*4)>PpsSplitInferenceBoundaryPosX y0+cbHeight is greater than PpsSplitInferenceBoundaryPosY and (SubPicTop[SubPicIdx])*(subpic_grid_row_height_minus1+1)*4)<PpsSplitInferenceBoundaryPosY and (SubPicTop[SubPicIdx]+SubPicHeight[i])*(subpic_grid_row_height_minus1+1)*4)>PpsSplitInferenceBoundaryPosY Otherwise, the value of split_cu_flag is inferred to be equal to 0.

Another equivalent algorithm to determine the value of split_cu_flag is the following:

When split_cu_flag is not present, the value of split_cu_flag is inferred as follows:

If one or more of the following conditions are true, the value of split_cu_flag is inferred to be equal to 1:

SubPicInferenceSplitFlag equal to 0 and x0+cbWidth is greater than pic_width_in_luma_samples.

SubPicInferenceSplitFlag equal to 0 and y0+cbHeight is greater than pic_height_in_luma_samples.

SubPicInferenceSplitFlag equal to 1 and x0+cbWidth is greater than SubPicInferenceBoundaryPosX.

SubPicInferenceSplitFlag equal to 1 and y0+cbHeight is greater than SubPicInferenceBoundaryPosY.

Otherwise, the value of split_cu_flag is inferred to be equal to 0.

The SubPicInferenceSplitFlag is equal to 1 when the subpicture that contains the coding block is crossed by a split inference boundary. SubPicInferenceBoundaryPosX is the horizontal coordinate of the vertical split inference boundary that crosses the current subpicture. When the subpicture is not crossed by a vertical split inference boundary, SubPicInferenceBoundaryPosX is set to a value greater or equal to the horizontal coordinate of the right boundary of the subpicture to avoid unnecessary split inference. Similarly SubPicInferenceBoundaryPosY is the vertical coordinate of the horizontal split inference boundary that crosses the current subpicture, if any. Otherwise, when the subpicture is not crossed by a horizontal split inference boundary, SubPicInferenceBoundaryPosY is set to a value greater or equal to the horizontal coordinate of the right boundary of the subpicture. The factor "4" is introduced because the split inference boundary is constrained to correspond to the smallest coding block boundary. It is assumed that the size of the smallest coding block is 4×4. If the size of the smallest coding block is different, another factor may be used in these equations.

In another example, the syntax elements described above in PPS can be defined at SPS level which can be advantageous when the split inference boundaries are not changing at each new PPS NAL unit. The syntax of SPS includes thus for example the following elements:

|  | Descriptor |
| --- | --- |
| sequence_parameter_set_rbsp( ) { | |
| [...] | |
| subpic_split_inference_flag | u(1) |
| if (subpic_split_inference_flag ) { | |

-continued

| | Descriptor |
|---|---|
| split_inference_boundary_pos_x | u(13) |
| split_inference_boundary_pos_y | u(13) |
| } | |

Wherein subpic_split_inference_flag, split_inference_boundary_pos_x and split_inference_boundary_pos_y have the similar semantics as pps_subpic_split_inference_flag, pps_split_inference_boundary_pos_x and pps_split_inference_boundary_pos_y:

subpic_split_inference_flag is a flag indicating the use of a subpicture splitting inference. subpic_split_inference_flag equal to 1 indicates the presence of split_inference_boundary_pos_x and split_inference_boundary_pos_y; subpic_split_inference_flag equal to 0 indicates the absence of split_inference_boundary_pos_x and split_inference_boundary_pos_y;

split_inference_boundary_pos_x is used to compute the value of SplitInferenceBoundaryPosX, which specifies the location of the vertical split inference boundary in units of luma samples. split_inference_boundary_pos_x may be in the range of 1 to Ceil (pic_width_in_luma_samples÷4)−1, inclusive.

The location of the vertical split inference boundary SplitInferenceBoundaryPosX is derived as follows:

$$\text{SplitInferenceBoundaryPosX} = \text{split\_inference\_boundary\_pos\_x} * 4$$

split_inference_boundary_pos_y is used to compute the value of SplitInferenceBoundaryPosY, which specifies the location of the horizontal split inference boundary in units of luma samples. split_inference_boundary_pos_y may be in the range of 1 to Ceil (pic_height_in_luma_samples÷4)−1, inclusive.

The location the of horizontal split inference boundary SplitInferenceBoundaryPosY is derived as follows:

$$\text{SplitInferenceBoundaryPosY} = \text{split\_inference\_boundary\_pos\_y} * 4;$$

The Split_inference_boundary_pos_x and split_inference_boundary_pos_y syntax elements are coded for instance using a fix length code of 13 bits or equal to log2(pic_width_in_luma_samples/4) for Split_inference_boundary_pos_x and equal to log2(pic_height_in_luma_samples/4) for Split_inference_boundary_pos_x. It is also possible to use an Exp-Golomb code.

In another embodiment, split_inference_boundary_pos_y may be in the range of 1 to Ceil (pic_height_in_luma_samples÷4), inclusive and split_inference_boundary_pos_x may be in the range of 1 to Ceil(pic_width_in_luma_samples÷4), inclusive. In such a case, the maximum value of the ranges indicates that the split inference boundary is aligned with or is outside of the picture boundaries. As a result, when set to the maximum value, it indicates that the vertical or horizontal split boundary is not used. In a variant, two distinct flags are used, one for each vertical and horizontal split inference boundaries. In this variant, the presence of split_inference_boundary_pos_x and split_inference_boundary_pos_y is conditional to these flags values.

In another embodiment, the PPS defines one or more horizontal and vertical split inference boundaries. The encoder specifies the number of horizontal split inference boundaries and also the number of vertical split inference boundaries. These boundaries are limited to picture-wide boundaries. For instance, the syntax of the PPS contains the following elements:

| | Descriptor |
|---|---|
| picture_parameter_set_rbsp( ) { | |
| [...] | |
| pps_subpic_split_inference_flag | u(1) |
| if (pps_subpic_split_inference_flag ) { | |
| pps_num_ver_split_inference_boundaries | ue(v) |
| for( i = 0; i < | |
| pps_num_ver_split_inference_boundaries ; i++ ) | |
| pps_split_inference_boundaries_pos_x[ i ] | u(13) |
| pps_num_hor_split_inference_boundaries | ue(v) |
| for( i = 0; i < | |
| pps_num_hor_split_inference_boundaries ; i++ ) | |
| pps_split_inference_boundaries_pos_y[ i ] | u(13) |
| } | | pps_num_ver_split_inference_boundaries specifies the number of pps_split_inference_boundaries_pos_x[i] syntax elements that are present in the PPS. When pps_num_ver_split_inference_boundaries is not present, it is inferred to be equal to 0.

pps_split_inference_boundaries_pos_x[i] is used to compute the value of PpsSplitInferenceBoundaryPosX[i], which specifies the location of the i-th vertical split inference boundary in units of luma samples. pps_split_inference_boundary_pos_x[i] may be in the range of 1 to Ceil (pic_width_in_luma_samples÷4)−1, inclusive. This coding syntax element is coded for instance using a fix length code of 13 bits or equal to log2(pic_width_in_luma_samples/4). It is also possible to use an Exp-Golomb code.

The location of the i-th vertical split inference boundary PpsSplitInferenceBoundaryPosX[i] is derived as follows:

$$\text{PpsSplitInferenceBoundaryPosX}[i] = \text{pps\_split\_inference\_boundary\_pos\_x}[i] * 4$$

The distance between any two vertical split inference boundaries may be greater than or equal to CtbSizeY luma samples, which is the size of the CTB in luma sample.

pps_num_hor_split_inference_boundaries specifies the number of pps_split_inference_boundaries_pos_y[i] syntax elements that are present in the PPS. When pps_num_hor_split_inference_boundaries is not present, it is inferred to be equal to 0.

pps_split_inference_boundaries_pos_y[i] is used to compute the value of PpsSplitInferenceBoundaryPosY[i], which specifies the location of the i-th horizontal split inference boundary in units of luma samples. pps_split_inference_boundary_pos_y[i] may be in the range of 1 to Ceil(pic_height_in_luma_samples÷4)−1, inclusive. This coding syntax element is coded for instance using a fix length code of 13 bits or equal to log2(pic_height_in_luma_samples/4). It is also possible to use an Exp-Golomb code.

The location of the i-th horizontal split inference boundary PpsSplitInferenceBoundaryPosY[i] is derived as follows:

$$\text{PpsSplitInferenceBoundaryPosX}[i] = \text{pps\_split\_inference\_boundary\_pos\_y}[i] * 4$$

The distance between any two horizontal split inference boundaries may be greater than or equal to CtbSizeY luma samples which is the size of the CTB in luma sample.

In another embodiment, the encoder specifies the location of the picture-wide splitting inference boundary/ies relatively to the grid formed by the CTBs of the picture. Typically, the SPS or the PPS includes syntax elements to indicate the number of vertical and horizontal boundaries for the split inference process and their location as an index of the CTB row or CTB columns. For each of the CTB rows (resp. columns) described in the PPS, the encoder indicates the width (resp. height) of the CTB for the inference process.

In a variant of this embodiment, the encoder and the decoder can determine the subpicture boundaries which are picture-wide from the subpicture definition. In particular, the encoder determines NumVerSplitInferenceBoundaries which is the number of vertical picture-wide subpicture boundaries and NumHorSplitInferenceBoundaries which is the number of horizontal picture-wide subpicture boundaries. It also determines the position on x-axis of the i-th (in raster scan order) vertical picture-wide subpicture boundaries and store it in PictureWideSubPictureBoundaryPosX[i] variable. It also determines the position on y-axis of the i-th (in raster scan order) horizontal picture-wide subpicture boundaries and stores it in PictureWideSubPictureBoundaryPosY[i] variable.

The encoder then encodes the width (resp. height) used by the split inference for the CTB row (resp. cols) at the left (resp. top) of the vertical (resp. horizontal) picture picture-wide subpicture boundaries.

For instance, the PPS includes the following syntax elements:

|  | Descriptor |
| --- | --- |
| picture_parameter_set_rbsp( ) { | |
| [...] | |
| pps_subpic_split_inference_flag | u(1) |
| if (pps_subpic_split_inference_flag ) { | |
| for( i = 0; i < NumVerSplitInferenceBoundaries; i++ ) | |
| pps_split_inference_ctb_width[ i ] | u(v) |
| for( i = 0; i < NumHorSplitInferenceBoundaries; i++ ) | |
| pps_split_inference_ctb_height[ i ] | u(v) |
| } | |

Wherein:

pps_split_inference_ctb_width[i] is used to compute the value of PpsSplitInferenceBoundaryPosX[i], which specifies the location of the i-th vertical split inference boundary in units of luma samples. pps_split_inference_ctb_width[i] is specified in units of coding blocks of MinCbSizeY width and may be in the range of 0 . . . CtbSizeY/MinCbSizeY−1, inclusive. This coding syntax element is coded for instance using a fix length code equal to log2(CtbSizeY/MinCbSizeY−1). It is also possible to use an Exp-Golomb code.

The location (in luma samples) of the i-th vertical split inference boundary PpsSplitInferenceBoundaryPosX[i] is derived as follows:

$$\text{PpsSplitInferenceBoundaryPosX}[i] = \text{PictureWideSubPictureBoundaryPosX}[i] - \text{CtbSizeY} + \text{pps\_split\_inference\_ctb\_width}[i] * \text{MinCbSizeY}.$$

pps_split_inference_ctb_height[i] is used to compute the value of PpsSplitInferenceBoundaryPosY[i], which specifies the location of the i-th horizontal split inference boundary in units of luma samples. pps_split_inference_ctb_height[i] is specified in units of coding blocks of MinCbSizeY height and may be in the range of 0 . . . CtbSizeY/MinCbSizeY−1, inclusive. This coding syntax element is coded for instance using a fix length code equal to log2(CtbSizeY/MinCbSizeY−1). It is also possible to use an Exp-Golomb code.

The location (in luma samples) of the i-th horizontal split inference boundary PpsSplitInferenceBoundaryPosY[i] is derived as follows:

$$\text{PpsSplitInferenceBoundaryPosY}[i] = \text{PictureWideSubPictureBoundaryPosY}[i] - \text{CtbSizeY} + \text{pps\_split\_inference\_ctb\_height}[i] * \text{MinCbSizeY}.$$

In another embodiment, the split inference boundaries are deduced from subpicture partitioning (for example from the subpicture grid). In particular, the encoder may describe subpicture boundaries not aligned with the CTB boundaries. For example, the subpicture partitioning defines a subpicture grid element size that is lower than the CTB size. When two contiguous grid elements have two different subpicture indexes and belong to the same CTB, this indicates that the first subpicture has a right (resp. bottom) boundary not aligned with CTB boundaries. The second subpicture has a left (resp. top) boundary not aligned with CTB boundaries. In such a case, the inference split boundary is deduced to align with the right (resp. bottom) boundary of the first subpicture and therefore is aligned with the left (resp. top) boundary of the second subpicture. In a variant, a different signaling is used to indicate the right and left boundaries of the subpicture for example by explicitly indicating the width and height of each subpicture with a unit lower than CTB size unit. In such a case, the subpicture width and height are compared with their values in CTB units to determine the subpicture not aligned with the CTB boundaries. In another variant, a specific values for a subpicture element is reserved to indicate that this subpicture grid element has no coded data. Deducing split inference boundaries from a subpicture partitioning then avoids explicit signaling of the split inference boundaries in the SPS, PPS or any parameter set or SEI.

VVC specification defines a conformance windows in the PPS as represented in the table below:

|  | Descriptor |
| --- | --- |
| pic_parameter_set_rbsp( ) { | |
| pps_pic_parameter_set_id | ue(v) |
| pps_seq_parameter_set_id | ue(v) |
| pic_width_in_luma_samples | ue(v) |
| pic_height_in_luma_samples | ue(v) |
| conformance_window_flag | u(1) |
| if( conformance_window_flag ) { | |
| conf_win_left_offset | ue(v) |
| conf_win_right_offset | ue(v) |
| conf_win_top_offset | ue(v) |
| conf_win_bottom_offset | ue(v) |
| } | |

This conformance window is a rectangular area in each picture represented by left, right, top and bottom offsets to the picture boundaries. At the end of the decoding process, a decoder applies a cropping process to remove the pixels outside of the conformance window.

In previous embodiments, we described that the encoder skips some coding blocks in CTB crossed by split inference boundary. The skipped coding blocks are located at the right of the vertical split inference boundaries and below the horizontal ones. In one embodiment, the decoder will decode a CTB with undefined pixels for those coding blocks. For this reason, it is proposed to add syntax elements in the PPS that would define the conformant window of each subpicture.

In one embodiment, a parameter set includes new syntax elements to indicate the rectangular area in luma samples in each subpicture that is conformant. It is all the pixels decoded by the decoder, which values are equal to the value encoded by the encoder i.e., corresponding to the useful part of the subpicture.

Typically, the SPS or the PPS defines the four conformance window offset parameters for each subpicture of the stream that has the flag subpic_treated_as_pic_flag equal true. For example, the syntax may be as follows:

| | Descriptor |
|---|---|
| seq_parameter_set_rbsp( ) { | |
| [...] | |
| subpics_present_flag | u(1) |
| if( subpics_present_flag ) { | |
|   max_subpics_minus1 | u(8) |
|   subpic_grid_col_width_minus1 | u(v) |
|   subpic_grid_row_height_minus1 | u(v) |
|   subpic_split_inference_flag | u(1) |
|   for( i = 0; i < NumSubPicGridRows; i++ ) | |
|     for( j = 0; j < NumSubPicGridCols; j++ ) | |
|       subpic_grid_idx[ i ][ j ] | u(v) |
|   for( i = 0; i <= NumSubPics; i++ ) { | |
|     subpic_treated_as_pic_flag[ i ] | u(1) |
|     if( subpic split inference flag && | |
|     subpic_treated_as_pic_flag[ i ]) { | |
|       subpic_conf_win_left_offset[ i ] | ue(v) |
|       subpic_conf_win_right_offset[ i ] | ue(v) |
|       subpic_conf_win_top_offset[ i ] | ue(v) |
|       subpic_conf_win_bottom_offset[ i ] | ue(v) |
|     } | |
|     loop_filter_across_subpic_enabled_flag[ i ] | u(1) |
|   } | |
| } | |
| } | |

The syntax elements subpic_conf_win_left_offset[i], subpic_conf_win_right_offset[i], subpic_conf_win_top_offset [i], subpic_conf_win_bottom_offset[i], subpic_conf_win_left_offset[i] specify the four conformance window offset parameters.

In another embodiment, for example when the encoder constrains the split inference boundaries to span across the picture width and height, the undefined pixels form one or more bands of pixels in the picture. As a result, instead of specifying the conformance area in each subpicture, the PPS describes the band of pixels to exclude from the conformance window and that should be cropped.

For example, the PPS defines the number of bands of pixels to exclude from the conformance window defined for the picture in the PPS. For each band of pixels, the encoder specifies the width of the band. For example, the syntax of the PPS may include the elements:

| | Descriptor |
|---|---|
| picture_parameter_set_rbsp( ) { | |
| [...] | |
| conformance_exclusion_band_flag | u(1) |
| if (conformance_exclusion_band_flag) { | |
|   num_ver_conformance_exclusion_bands | ue(v) |
|   for( i = 0; i < | |
|   pps_num_ver_conformance_exclusion_bands; i++ ) { | |
|     conformance_exclusion_ver_band_width_minus1 | ue(v) |
|     [ i ] | |
|     conformance_exclusion_ver_band_pos_x[ i ] | ue(v) |
|   } | |
|   num_hor_conformance_exclusion_bands | ue(v) |
|   for( i = 0; i < | |
|   pps_num_hor_conformance_exclusion_bands; i++ ) | |
|     conformance_exclusion_hor_band_height_minus1 | ue(v) |
|     [ i ] | |
|     conformance_exclusion_hor_band_pos_y[ i ] | ue(v) |
| } | |

With the following semantics:

conformance_exclusion_band_flag equal 1 indicates the presence of conformance exclusion bands in the PPS.

conformance_exclusion_band_flag equal 0 indicate the absence of conformance exclusion bands in the PPS.

num_ver_conformance_exclusion_bands specifies the number of conformance_exclusion_ver_band_pos_x[i] and conformance_exclusion_ver_band_width_minus1 [i] syntax elements that are present in the PPS. When num_ver_conformance_exclusion_bands is not present, it is inferred to be equal to 0.

conformance_exclusion_ver_band_width_minus1[i] plus 1 specifies the width of the i-th vertical conformance exclusion band in luma samples and is used to compute PpsConformanceVerBandPosX[i], which specifies the location of the i-th vertical conformance exclusion band boundary in units of luma samples. Conformance. conformance_exclusion_ver_band_width_minus1[i] may be in the range $0 \ldots CtbSizeY-2$. This coding syntax element is coded for instance using a fix length code of 8 bits or equal to log2(pic_width_in_luma_samples/CtbSizeY) or equal to log2(CtbSizeY−2). It is also possible to use an Exp-Golomb code.

conformance_exclusion_ver_band_pos_x[i] is used to compute the value of PpsConformanceVerBandPosX [i], which specifies the location of the i-th vertical conformance exclusion band boundary in units of luma samples. conformance_exclusion_ver_band_pos_x[i] may be in the range of $0 \ldots PicWidthInCtbsY$, inclusive. In a variant, the range is $1 \ldots PicWidthInCtbsY-1$, inclusive to avoid specifying a vertical band starting at the first or last pixel column of the picture. This coding syntax element is coded for instance using a fix length code of 8 bits or equal to log2(pic_width_in_luma_samples/CtbSizeY). It is also possible to use an Exp-Golomb code.

The location of the i-th vertical exclusion band PpsConformanceVerBandPosX [i] is derived as follows:

$$PpsConformanceVerBandPosX[i]=conformance\_exclusion\_ver\_band\_pos\_x[i]*CtbSizeY-(conformance\_exclusion\_ver\_band\_width\_minus1[i]+1)$$

The distance between any two vertical conformance exclusion band boundaries may be greater than or equal to CtbSizeY luma samples which is the size of the CTB in luma samples. In a variant, there is no restriction on the distance between two vertical conformance exclusion band boundaries and each band may overlap another band. In such a case, the decoder has to determine the overlapping bands to determine the actual conformance area of the picture.

num_hor_conformance_exclusion_bands specifies the number of conformance_exclusion_hor_band_pos_y[i] and conformance_exclusion_hor_band_height_minus1 [i] syntax elements that are present in the PPS. When num_hor_conformance_exclusion_bands is not present, it is inferred to be equal to 0.

conformance_exclusion_hor_band_height_minus1[i] plus 1 specifies the height of the i-th horizontal conformance exclusion band in luma samples and is used to compute PpsConformanceHorBandPosY[i], which specifies the location of the i-th horizontal conformance exclusion band boundary in units of luma samples. Conformance. conformance_exclusion_hor_band_height_minus1[i] may be in the range $0 \ldots CtbSizeY-2$. This coding syntax element is coded for instance using a fix length code of 7 bits or equal to log2 (pic_height_in_luma_samples/CtbSizeY). It is also possible to use an Exp-Golomb code.

conformance_exclusion_hor_band_pos_y[i] is used to compute the value of PpsConformanceHorBandPosY

[i], which specifies the location of the i-th horizontal conformance exclusion band boundary in units of luma samples. conformance_exclusion_hor_band_pos_y[i] may be in the range of 0 . . . PicHeightInCtbsY. PicHeightInCtbsY is the height of the picture in CTB unit, inclusive. In a variant, the range is 1 . . . PicHeightInCtbsY−1, inclusive to avoid specifying a horizontal band starting at the first or last pixel row of the picture. This coding syntax element is coded for instance using a fix length code of 8 bits or equal to log2(pic_height_in_luma_samples/CtbSizeY). It is also possible to use an Exp-Golomb code.

The location of the i-th horizontal exclusion band PpsConformanceHorBandPosY [i] is derived as follows:

$$PpsConformanceHorBandPosY[i]=conformance\_exclusion\_hor\_band\_pos\_y[i]*CtbSizeY-(conformance\_exclusion\_hor\_band\_height\_minus1[i]+1)$$

The distance between any two horizontal conformance exclusion band boundaries may be greater than or equal to CtbSizeY luma samples, which is the size of the CTB in luma samples. In a variant, there is no restriction on the distance between two horizontal conformance exclusion band boundaries and each band may overlap another band. In such a case, the decoder has to determine the overlapping bands to determine the actual conformance area of the picture.

In a variant, the number of horizontal and vertical exclusion bands is optional. In this case, when the num_ver_conformance_exclusion_bands and num_hor_conformance_exclusion_bands syntax elements are absent, their values are inferred equal to 1. The syntax of the PPS is for example the following:

| | Descriptor |
| --- | --- |
| picture_parameter_set_rbsp( ) { | |
| [...] | |
| conformance_exclusion_band_flag | u(1) |
| if (conformance_exclusion_band_flag) { | |
| conformance_exclusion_ver_band_width_minus1 | ue(v) |
| conformance_exclusion_ver_band_pos_x | ue(v) |
| conformance_exclusion_hor_band_height_minus1 | ue(v) |
| conformance_exclusion_hor_band_pos_y | ue(v) |
| } | |

In a variant, the description of horizontal or/and vertical split inference boundaries information is optional. For instance, the syntax of the PPS (or SPS) is the following:

| | Descriptor |
| --- | --- |
| picture_parameter_set_rbsp( ) { | |
| [...] | |
| conformance_exclusion_ver_band_flag | u(1) |
| if (conformance_exclusion_ver_band_flag) { | |
| conformance_exclusion_ver_band_width_minus1 | ue(v) |
| conformance_exclusion_ver_band_pos_x | ue(v) |
| } | |
| conformance_exclusion_hor_band_flag | u(1) |
| if (conformance_exclusion_hor_band_flag) { | |
| conformance_exclusion_hor_band_height_minus1 | ue(v) |
| conformance_exclusion_hor_band_pos_y | ue(v) |
| } | |

The semantics of the new syntax (in bold) element is the following:

conformance_exclusion_ver_band_flag equal 1 indicates the presence of conformance_exclusion_ver_ band_width_minus1 and conformance_exclusion_ver_band_pos_x in the PPS, which specifies the vertical conformance exclusion band. conformance_exclusion_band_flag equal 0 indicates the absence of conformance_exclusion_ver_band_width_minus1 and conformance_exclusion_ver_band_pos_x in the PPS.

conformance_exclusion_ver_band_width_minus1 plus 1 specifies the width of the vertical conformance exclusion band in luma samples and is used to compute PpsConformanceVerBandPosX. PpsConformanceVerBandPosX specifies the location of the left boundary of the vertical conformance exclusion band. conformance_exclusion_ver_band_width_minus1 may be in the range 0 . . . CtbSizeY−2.

conformance_exclusion_ver_band_pos_x is used to compute the value of PpsConformanceVerBandPosX. conformance_exclusion_ver_band_pos_x may be in the range of 1 . . . PicWidthInCtbsY−1, inclusive.

The location of left boundary of the vertical exclusion band PpsConformanceVerBandPosX is derived as follows:

$$PpsConformanceVerBandPosX=conformance\_exclusion\_ver\_band\_pos\_x*CtbSizeY-(conformance\_exclusion\_ver\_band\_width\_minus1+1)$$

conformance_exclusion_hor_band_flag equal 1 indicates the presence of conformance_exclusion_hor_band_height_minus1 and conformance_exclusion_hor_band_pos_y in the PPS, which specifies the horizontal conformance exclusion band. conformance_exclusion_band_flag equal 0 indicates the absence of conformance_exclusion_hor_band_height_minus1 and conformance_exclusion_hor_band_pos_y in the PPS.

conformance_exclusion_hor_band_height_minus1 plus 1 specifies the height of the horizontal conformance exclusion band in luma samples and is used to compute PpsConformanceHorBandPosY. PpsConformanceHorBandPosY specifies the location of the top boundary of the horizontal conformance exclusion band. conformance_exclusion_hor_band_height_minus1 may be in the range 0 . . . CtbSizeY−2.

conformance_exclusion_hor_band_pos_y is used to compute the value of PpsConformanceHorBandPosY. conformance_exclusion_hor_band_pos_y may be in the range of 1 . . . PicHeightInCtbsY−1, inclusive.

The location of the top boundary of the horizontal exclusion band PpsConformanceHorBandPosY is derived as follows:

$$PpsConformanceHorBandPosY=conformance\_exclusion\_hor\_band\_pos\_y*CtbSizeY-(conformance\_exclusion\_hor\_band\_height\_minus1+1)$$

In a variant, the width, height and coordinates of exclusion bands are expressed in chroma samples. These values in luma samples are obtained by multiplying the values expressed in chroma samples with SubWidthC and SubHeightC. SubWidthC and SubHeightC represent respectively the horizontal and vertical sampling ratio between luma and chroma components. For example, SubWidthC and SubHeightC equal to 2 when the chroma format is 4:2:0. In another variant, the width, height and coordinates of exclusion bands are expressed in minimal CTB size units to further reduce the length of syntax elements.

In another embodiment, the width and height of the exclusion band are greater than a CTB. It allows to merge two contiguous exclusion bands of pixels into a single exclusion band. For example, when two neighbour subpictures define two sets of non-conformant pixels that are adjacent. This allows a more compact description of exclusion bands.

In another embodiment, the number of vertical conformance exclusion bands and the number of horizontal conformance exclusion bands are inferred equal to the number of the vertical split inference boundaries and horizontal split inference boundaries respectively.

In another embodiment, the locations of vertical and horizontal conformance exclusion bands are inferred equal to the locations of the vertical split inference boundaries and horizontal split inference boundaries respectively.

In another embodiment, the width of a given vertical conformance exclusion band is inferred equal to the number of pixels between the vertical split inference boundaries at the same location and the closest right CTB boundary. Same applies for horizontal exclusion band with horizontal split inference boundaries.

In another embodiment, subpicture split inference is deduced from the subpicture partitioning. The pixels to exclude from the conformant window are inferred to correspond to the areas between the right (resp. bottom) boundaries of subpicture that are not aligned with CTB boundaries and the right (resp. bottom) boundaries of these CTBs.

In a variant, these areas are grouped in different subpictures. In such a case, either the width or height of these subpictures is less than CTB size. It is thus possible to associate these non-conformant subpictures with specific indexes. The SPS or PPS may provide a list of the subpicture indexes that are not conformant and that should be excluded from the conformance window. In another embodiment, the number of bands excluded from the conformance window and their sizes are determined from the inference split boundaries location.

In another alternative, the number of bands excluded from the conformance window and their sizes are determined from the inference split boundaries location.

The conformance cropping window contains the luma samples with horizontal picture coordinates from SubWidthC*conf_win_left_offset to pic_width_in_luma_samples–(SubWidthC*conf_win_right_offset+1) and vertical picture coordinates from SubHeightC*conf_win_top_offset to pic_height_in_luma_samples–(SubHeightC*conf_win_bottom_offset+1), inclusive.

In addition, the luma samples with horizontal picture coordinates from PpsConformanceVerBandPosX[i] to PpsConformanceVerBandPosX[i]+conformance_exclusion_ ver_band_width_minus1[i]+1 are excluded from the conformance window for i in the range of 0 . . . num_ver_conformance_exclusion_bands.

In addition the luma samples with vertical picture coordinates from PpsConformanceHorBandPosY[i] to PpsConformanceHorBandPosY[i]+conformance_exclusion_ hor_band_height_minus1[i]+1 are excluded from the conformance window for i in the range of 0 . . . num_hor_conformance_exclusion_bands.

The width and the height of the picture after the cropping process corresponds to the variables PicOutputWidthL and PicOutputHeightL that are derived as follows: the width (resp. height) of this picture is equal to the cropping window width (resp. height) minus the widths (resp. heigths) of the exclusion band of pixels which corresponds to the following pseudo-code:

```
PicOutputWidthL = pic_width_in_luma_samples – SubWidthC*(
conf_win_right_offset + conf_win_left_offset )
        for (i=0; i< num_ver_conformance_exclusion_bands; i++)
                PicOutputWidthL -= conformance_exclusion_ver_band_width_minus1[ i ]
+ 1
        PicOutputHeightL = pic_height_in_pic_size_units – SubHeightC*(
conf_win_bottom_offset + conf_win_top_offset )
        for (i=0; i< num_hor_conformance_exclusion_bands; i++)
                PicOutputHeightL -=
conformance_exclusion_hor_band_height_minus1[ i ] + 1.
```

In an embodiment, the picture and its subpictures that may be displaced in a merge operation are constraints to have a size that is a multiple of the CTB size in both directions. Typically, it can be done by extending the input picture with padding pixels when it does not already respect this constraint. Accordingly, there is no inferring boundaries mechanism to be used. This constraint is signaled in the bitstream. For example, a flag may be used to indicate that the subpictures are subjected to this constraint and can therefore be merged freely and displaced in the resulting image at any location without any boundaries issue. In order to assure that the subpictures may be freely merged, an additional constraint is associated with the flag, which is that the subpictures are independently decodable. The flag may be defined as applying to all subpictures in the images or it may be defined at the subpicture level to indicate that the associated subpicture can be freely merged. In one embodiment, the flag indicating that the sizes of the picture and its subpictures are a multiple of the CTB size is defined in the Sequence Parameter Set, and is valid for all the subpictures of the sequence.

In some embodiments, a conformance window may be defined at the subpicture level, for example in a SEI message.

In one embodiment, the syntax of the SPS is changed to contain one additional flag indicating whether the encoding of the subpictures of the bitstream constrains encoding tools and video sequence characteristics to allow merging operations. When set, this flag constrains the subpicture to be independently decodable or not. The syntax may be as follows:

|  | Descriptor |
|---|---|
| sequence_parameter_set_rbsp( ) { | |
| [...] | |
| pic_width_max_in_luma_samples | ue(v) |
| pic_height_max_in_luma_samples | ue(v) |
| sps_log2_ctu_size_minus5 | u(2) |
| subpics_present_flag | u(1) |
| if( subpics_present_flag ) { | |
| sps_num_subpics_minus1 | u(8) |
| subpic_mergeable_flag | u(1) |
| for( i = 0; i <= sps_num_subpics_minus1; i++ ) { | |
| subpic_ctu_top_left_x[ i ] | u(v) |

-continued

| | Descriptor |
|---|---|
| subpic_ctu_top_left_y[ i ] | u(v) |
| subpic_width_minus1[ i ] | u(v) |
| subpic_height_minus1[ i ] | u(v) |
| if (!subpic_mergeable_flag) | |
|     subpic_treated_as_pic_flag[ i ] | u(1) |
|     loop_filter_across_subpic_enabled_flag[ i ] | u(1) |
|     } | u(8) |
|   } | |
| } | |
| [...] | |

For example, the semantics of the elements are the following:

subpic_mergeable_flag equal to 1 indicates all subpictures of the picture are constrained for merging operations. subpic_mergeable_flag equal to 0 indicates that subpictures may or may not be constrained.

pic_width_max_in_luma_samples specifies the maximum width, in units of luma samples, of each decoded picture referring to the SPS. pic_width_max_in_luma_samples shall not be equal to 0 and shall be an integer multiple of Max(8, MinCbSizeY). When subpic_mergeable_flag equal to 1, pic_width_max_in_luma_samples shall be an integer multiple of CtbSizeY. As a result, when the subpictures are constrained for merging operation (subpic_mergeable_flag equal to 1), the coded picture is constrained to use padding when the original width of the picture is not a multiple of CTB size.

pic_height_max_in_luma_samples specifies the maximum height, in units of luma samples, of each decoded picture referring to the SPS. pic_height_max_in_luma_samples shall not be equal to 0 and shall be an integer multiple of Max(8, MinCbSizeY). When subpic_mergeable_flag mergeable_flag equal to 1, pic_height_max_in_luma_samples shall be an integer multiple of CtbSizeY. As a result, when the subpictures are constrained for merging operation (subpic_mergeable_flag equal to 1), the coded picture is constrained to use padding when the original height of the picture is not a multiple of CTB size.

In this embodiment, the semantic of some elements of the PPS may be constrained to ensure each picture referring to the PPS has a picture size multiple of the CTB size when the subpicture are constrained for merging operations. For example, the semantics of the pic_width_in_luma_samples and pic_height_in_luma_samples are the following:

pic_width_in_luma_samples specifies the width of each decoded picture referring to the PPS in units of luma samples. pic_width_in_luma_samples shall not be equal to 0, shall be an integer multiple of Max(8, MinCbSizeY), and shall be less than or equal to pic_width_max_in_luma_samples. When subpic_mergeable_flag equal to 1 (for example in the SPS with identifier signalled in the PPS), pic_width_in_luma_samples shall be an integer multiple of CtbSizeY.

pic_height_in_luma_samples specifies the height of each decoded picture referring to the PPS in units of luma samples. pic_height_in_luma_samples shall not be equal to 0 and shall be an integer multiple of Max(8, MinCbSizeY), and shall be less than or equal to pic_height_max_in_luma_samples. When subpic_mergeable_flag equal to 1, pic_height_in_luma_samples shall be an integer multiple of CtbSizeY.

This first set of constraints on the picture ensures that any merging location is possible for a subpicture in the pictures of merged stream when the subpic_mergeable_flag is equal to 1. The encoder may have to use padding data to make both width and height of the pictures multiple of the CTB size. The encoder may signals the areas with padding data by defining conformance windows in the bitstream. Typically, it may define one conformance window for each subpicture in a SEI message.

In another embodiment, the mergeable flag also constrains the temporal prediction mechanism inside each subpicture for all the subpictures described in the Parameter Set NAL units when the subpictures are constrained for merging operation (subpic_mergeable_flag equal to 1).

For instance, subpic_treated_as_pic_flag[i] equal to 1 specifies that the i-th subpicture of each coded picture in the CLVS is treated as a picture in the decoding process excluding in-loop filtering operations. subpic_treated_as_pic_flag[i] equal to 0 specifies that the i-th subpicture of each coded picture in the CLVS is not treated as a picture in the decoding process excluding in-loop filtering operations. When not present, the value of subpic_treated_as_pic_flag[i] is inferred to be equal to subpic_mergeable_flag. As a result, when the subpicture are constrained for merging operations (subpic_mergeable_flag equals to 1), the subpic_treated_as_pic_flag[i] syntax elements are not present in the Parameter Set NAL unit and inferred equals to 1 which indicates the temporal prediction of the subpictures is constrained to each subpicture boundaries. Otherwise, the temporal predication may or may not be constrained.

In another embodiment, when the subpicture are constrained for merging operations (subpic_mergeable_flag equals to 1), the loop filter mechanism is disabled across the subpicture boundaries for all the subpictures described in the Parameter Set NAL units. For example, loop_filter_across_subpic_enabled_flag[i] equal to 1 specifies that in-loop filtering operations may be performed across the boundaries of the i-th subpicture in each coded picture in the CLVS. loop_filter_across_subpic_enabled_flag[i] equal to 0 specifies that in-loop filtering operations are not performed across the boundaries of the i-th subpicture in each coded picture in the CLVS. When not present, the value of loop_filter_across_subpic_enabled_pic_flag[i] is inferred to be equal to !subpic_mergeable_flag. As a result, when the subpicture are constrained for merging operations (subpic_mergeable_flag equals to 1), the loop_filter_across_subpic_enabled_pic_flag[i] syntax elements are not present in the Parameter Set NAL unit and inferred equals to 0 which indicates the loop filters are constrained to not be enabled across the subpicture boundaries. Otherwise, the loop filters may or may not be constrained.

In some embodiments, spatial access might be provided only on some time intervals. The proposed flag may correspondly be defined in PPS or even in a picture header. The picture header is a non-VCL NAL unit defining some syntax element defined at the picture level and that applies to all the slices of the picture.

In another embodiment, the subpicure signalling associates an identifier of subpicture with the subpicture index. This identifier is unique for a given subpicture and simplifies the merging operations since it permits to avoid rewriting the subpicture index in the slice headers when the subpicture is moved to a new location after a merging operation. For this reason, when subpictures are constrained for merging operations, one of the non-VCL NAL units may signal the subpicture identifiers in the bitstream.

Typically, the subpicture identifiers may be present in SPS, PPS or Picture Header. In particular the sps_subpic_id_present_flag is a flag of the SPS that indicates the presence of the supicture identifiers in the bitstream when equal to 1. The semantics of this syntax element is for example the following:

sps_subpic_id_present_flag equal to 1 specifies that subpicture ID mapping is present in the SPS. sps_subpic_id_present_flag equal to 0 specifies that subpicture ID mapping is not present in the SPS. When subpic_mergeable_flag equals to 1, sps_subpic_id_present_flag must be equal to 1. As a result, when the subpicture are constrained for merging operations, the signalling of subpicture identifier is provided in the bitstream. In a variant, when subpic_mergeable_flag equals to 1, sps_subpic_id_present_flag is not present in the SPS and inferred equal to 1. The corresponding syntax of the SPS may contain the following syntax elements:

|  | Descriptor |
| --- | --- |
| sequence_parameter_set_rbsp( ) { | |
| [...] | |
| if (!subpic_mergeable_flag) | |
| sps_subpic_id_present_flag | u(1) |
| if( sps_subpic_id_present_flag ) { | |
| sps_subpic_id_signalling_present_flag | u(1) |
| if( sps_subpic_id_signalling_present_flag ) { | |
| sps_subpic_id_len_minus1 | ue(v) |
| for( i = 0; i <= sps_num_subpics_minus1; i++ ) | |
| sps_subpic_id[ i ] | u(v) |
| } | |
| } | |
| } | |

In another embodiment, the presence of the subpicture identifiers in the Picture Header may make the merging operation more complex. Indeed, when the signalling of the identifiers is made in the Picture Header, it overrides the mapping of the subpicture identifiers that is made in the Parameter Sets NAL units. Since a different Picture Header is sent for each frame, there is a possibility that the mapping change at each picture. As a result, a typical merging operation needs to check whether the Picture Header modifies the subpicture identifiers mapping. To avoid this checking operation, when the subpictures are constrained for merging operations, the mapping of the identifiers in the Picture Header is disabled. The presence of the subpicture identifiers mapping in the Picture Header is controlled with ph_subpic_id_signalling_present_flag syntax element. In this embodiment, the semantics of ph_subpic_id_signalling_present_flag is as follows:

ph_subpic_id_signalling_present_flag equal to 1 specifies that subpicture ID mapping is signalled in the PH. ph_subpic_id_signalling_present_flag equal to 0 specifies that subpicture ID mapping is not signalled in the PH. When subpic_mergeable_flag equals to 1, ph_subpic_id_signalling_present_flag must be equal to 0. In a variant, when subpic_mergeable_flag equals to 1, ph_subpic_id_signalling_present_flag is not present in the picture header and is inferred equal to 0.

The PPS may also signal the mapping of the subpicture identifiers. As for Picture Header, it requires to check whether the mapping changed between two PPS NAL units. This additional check increases the complexity of the merging operation. As a result, in one embodiment when the subpictures are constrained for merging operations, the subpicture are constrained to be the same in each and every PPSs for which the subpic_mergeable_flag equal to 1. The pps_subpic_id[i] syntax element of the PPS specifies the subpicture ID (or identifier) of the i-th subpicture which corresponds to the mapping of the subpicture identifier with the subpicture index. When subpic_mergeable_flag equal to 1, all the PPS that refer to the same SPS shall have the same value of pps_subpic_id[i] for i in range of 0 to pps_num_subpics_minus1, inclusive.

In another embodiment, the information that indicates that the subpictures are constrained for merging operation corresponds to a particular profile of the VVC specification. Typically a particular value (e.g., 3) of the general_profile_idc syntax element indicates a profile to which the output layer conforms for subpicture merging operations. In a variant, the information that indicates that the subpictures are constrained for merging operation corresponds to a sub-profile. In that case, a particular value (e.g., 3) of the general_sub_profile_idc[i] indicates that the bitstream is constrained for subpicture merging operations.

The general constrained information structure of VVC is set by flags described in the profile, tier and level information that makes it possible to disable one or more encoding tools. In one embodiment, the general constrained information structure includes any of the following syntax elements:

no_dependent_subpicture_flag syntax element, that when equal to 1 specifies that subpic_treated_as_pic_flag[i] shall be equal to 1 for any value of i. no_dependent_subpicture_flag equal to 0 does not impose such a constraint. In a variant, when equal to 1, it specifies that subpic_treated_as_pic_flag[i] and loop_filter_across_subpic_enabled_flag[i] shall be equal to 1 for any value of i.

no_picture_header_subpicture_id_mapping syntax element that when equal to 1 specifies that all the picture header NAL units shall have ph_subpic_id_signalling_present_flag equal to 0. no_picture_header_subpicture_id_mapping equal to 0, does not impose such a constraint.

no_pps_subpicture_id_mapping_change syntax element that when equal to 1 specifies that all PPS NAL units shall have equal pps_subpic_id[i] values for any value of i. no_pps_subpicture_id_mapping_change equal to 0, does not impose such a constraint.

In an embodiment, a SEI message is proposed to handle in-picture areas that require post-decoding crop operation. This may result for example of a bitstream extraction and merging operations where some subpicture originally at the right or bottom border of a picture contained padding data. This SEI indicates decoders a conformance window for at least some subpictures defining picture areas containing padding or even unreliable or useless data that the content creator considers should be removed on the image to be displayed.

The SEI may provide the following syntax, for example

|  | Descriptor |
| --- | --- |
| subpicture_conformance_window (payloadSize) { | |
| subpic_conf_win_cancel_flag | u(1) |
| if (!subpic_conf_win_cancel_flag) { | |
| subpic_conf_win_num_subpics_minus1 | ue(v) |
| for( i = 0; i <= | |
| subpic_conf_win_num_subpics_minus1; i++ ) { | |
| subpic_conf_win_left_offset[ i ] | ue(v) |
| subpic_conf_win_right_offset[ i ] | ue(v) |
| subpic_conf_win_top_offset[ i ] | ue(v) |
| subpic_conf_win_bottom_offset[ i ] | ue(v) |

-continued

| | Descriptor |
| --- | --- |
| } | |
| } | |
| } | |
| } | |

With the following semantics:

subpic_conf_win_cancel_flag equal to 1 indicates that the SEI message cancels the persistence of any previous subpicture conformance window SEI message in output order that applies to the current layer. subpic_conf_win_cancel_flag equal to 0 indicates that subpicture conformance window information follows.

subpic_conf_win_num_subpics_minus1 plus 1 specifies the number of subpicture conformance windows present in the SEI message. This value is function of the number of subpictures present in the picture. Typically, it is a requirement that the value of subpic_conf_win_num_subpics_minus1 shall be equal to sps_num_subpics_minus1 to allow defining conformance windows for each subpicture.

subpic_conf_win_left_offset[i], subpic_cont_win_right_offset[i], subpic_conf_win_top_offset[i], and subpic_cont_win_bottom_offset[i] specify the samples of the i-th subpicture of the picture in the CLVS that are output from the decoding process, in terms of a rectangular region specified in picture coordinates for output relatively to the origin of the i-th subpicture as described in the SPS NAL unit.

The subpicture conformance cropping window of the i-th subpicture contains the luma samples with horizontal picture coordinates from SubPictureLuma_X[i]+SubWidthC*conf_win_left_offset to SubPictureLuma_X[i]+SubPictureLuma_Width[i]−(SubWidthC*subpic_conf_win_right_offset[i]+1) and vertical picture coordinates from SubPictureLuma_Y[i]+SubHeightC*subpic_conf_win_top_offset[i] to SubPictureLuma_Y[i]+SubPictureLuma_Height[i]−(SubHeightC*subpic_conf_win_bottom_offset[i]+1), inclusive. Wherein the SubPictureLuma_X[i] and SubPictureLuma_Y[i] specify the horizontal and vertical picture coordinates of the first pixel in the i-th subpicture, and SubPictureLuma_Width[i] and SubPictureLuma_Height[i] the width and the height in luma sample of the i-th subpicture described in the SPS. For example, these variables are computed as follows:

SubPictureLuma_X[i]=subpic_ctu_top_left_x[i]*CtbSizeY

SubPictureLuma_Y[i]=subpic_ctu_top_left_y[i]*CtbSizeY

SubPictureLuma_Width[i]=(subpic_width_minus1[i]+1)*CtbSizeY

SubPictureLuma_Height[i]=(subpic_height_minus1[i]+1)*CtbSizeY

In some cases, only a subset of the subpictures (typically, the ones with padding data) needs a conformance window. In such a case, a new syntax element indicates for each subpicture if a conformance window is signalled. For example, the "for" loop on each subpicture specifies a subpic_conf_win_signalled_flag[i] syntax element for the i-th subpcture described in the subpicture. When equal to 1, the offset parameters are present and a conformance window is specified for the subpicture. Otherwise, subpic_conf_ win_signalled_flag[i] equals to 0, no conformance is signalled for the i-th subpicture and the offset parameters are absent and inferred equal to 0. In a variant, the number of subpicture conformance windows described in the SEI message is different than the number of subpictures in the pictures and for each signalled subpicture conformance window signalled in the SEI, a list of one or more subpicture indexes in the picture is associated with the index of the subpicture conformance window. This list of indexes indicates the subpictures that use the subpicture conformance window. For instance, the of the indicates SEI for loop message a subpic_conf_win_num_subpics_minus1 [i] syntax element which is the number, minus 1, of subpicture indexes associated with i-th subpicture conformance window of the SEI message. Then a processing loop for j in the range of 0 to subpic_conf_win_num_subpics_minus1 [i] inclusive, defines the subpic_conf_win_subpic_index[i][j] syntax element. subpic_conf_win_subpic_index[i][j] specifies the j-th index of the subpicture that uses the i-th subpicture conformance window. In a variant, the SEI message may define a subpicture identifier instead of a subpicture index. In that case, the length in bits of the subpicture identifiers is optionally described in the SEI message.

Figure 12:
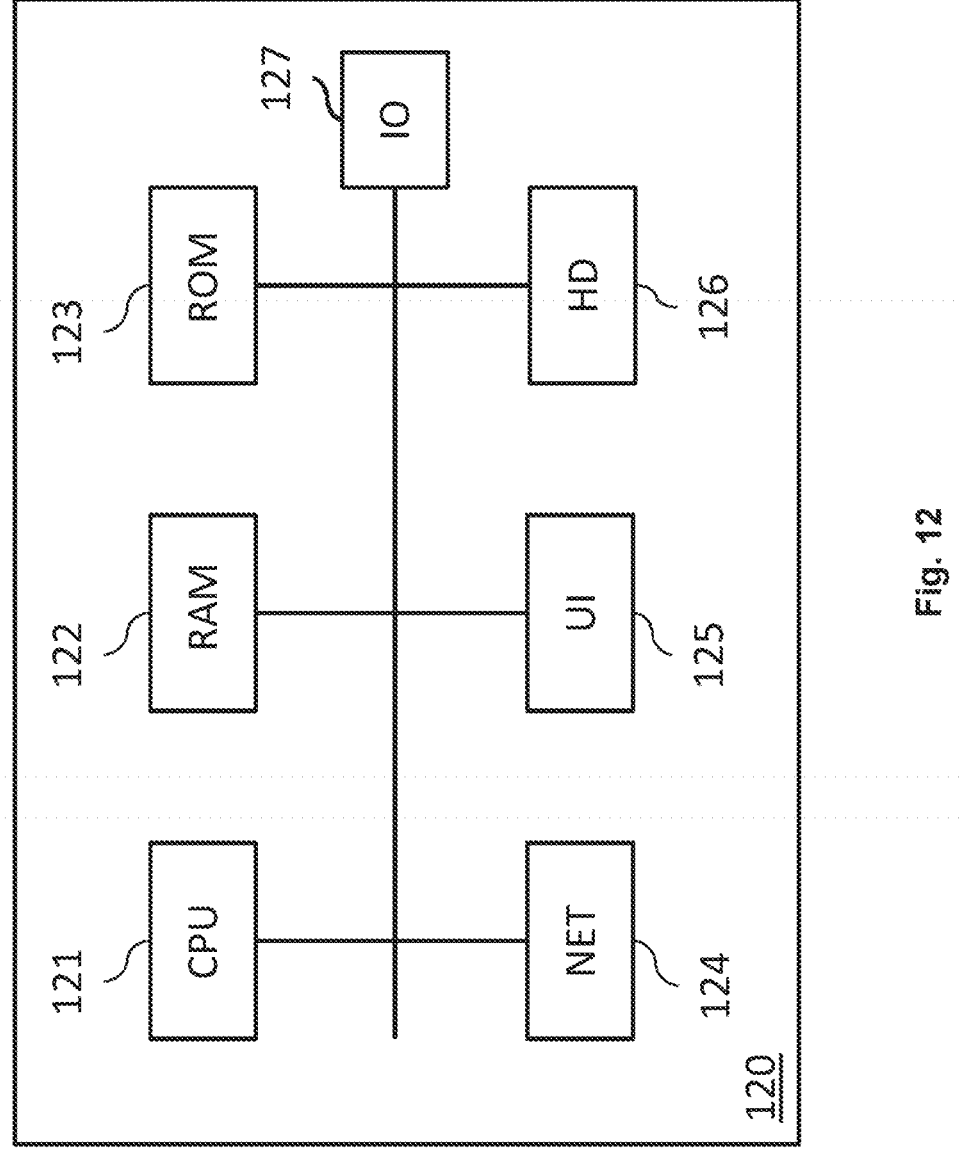
FIG. 12 is a schematic block diagram of a computing device for implementation of one or more embodiments of the invention.

FIG. 12 is a schematic block diagram of a computing device 120 for implementation of one or more embodiments of the invention. The computing device 120 may be a device such as a microcomputer, a workstation or a light portable device. The computing device 120 comprises a communication bus connected to:

a central processing unit 121, such as a microprocessor, denoted CPU;

a random access memory 122, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port, for example;

a read only memory 123, denoted ROM, for storing computer programs for implementing embodiments of the invention;

a network interface 124 is typically connected to a communication network over which digital data to be processed are transmitted or received. The network interface 124 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 121;

a user interface 125 may be used for receiving inputs from a user or to display information to a user;

a hard disk 126 denoted HD may be provided as a mass storage device;

an I/O module 127 may be used for receiving/sending data from/to external devices such as a video source or display.

The executable code may be stored either in read only memory 123, on the hard disk 126 or on a removable digital medium such as for example a disk. According to a variant, the executable code of the programs can be received by means of a communication network, via the network interface 124, in order to be stored in one of the storage means of the communication device 120, such as the hard disk 126, before being executed.

The central processing unit 121 is adapted to control and direct the execution of the instructions or portions of soft- ware code of the program or programs according to embodiments of the invention, which instructions are stored in one of the aforementioned storage means. After powering on, the CPU 121 is capable of executing instructions from main RAM memory 122 relating to a software application after those instructions have been loaded from the program ROM 123 or the hard-disc (HD) 126, for example. Such a software application, when executed by the CPU 121, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described herein above with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encoding video data comprising pictures into a bitstream, pictures being divided into subpictures each including one or more slices, the method comprising:

encoding, in a sequence parameter set of the bitstream, a first flag indicating whether information of a subpicture is present;

when a value of the first flag is 1, encoding, in the sequence parameter set of the bitstream, a second flag related to a constraint of subpictures;

when a value of the second flag is 0, encoding, for a given subpicture in a picture, a third flag and fourth flag in the sequence parameter set of the bitstream, the third flag indicating whether in-loop filtering operations across subpicture boundaries is enabled and the fourth flag indicating whether the given subpicture is treated as a picture in decoding process excluding in-loop filtering operations, wherein the third flag and the fourth flag are not encoded in the sequence parameter set of the bitstream when the value of the second flag is 1; and encoding coding tree blocks composing the pictures into the bitstream, wherein information for specifying a width of a subpicture is capable of being encoded in the sequence parameter set.

2. The method of claim 1, wherein the second flag is related to all the subpictures.

3. The method of claim 1, wherein subpictures are further identified with a subpicture identifier.

4. The method of claim 3, wherein subpicture identifiers defined in picture parameter sets must be identical in all the picture parameter sets.

5. The method of claim 1, wherein the second flag is associated with a particular profile.

6. The method of claim 1, wherein the method comprises:

when the value of the second flag is 1, all the subpictures have borders constrained as picture borders and there is no loop filtering across the subpicture boundaries.

7. The method of claim 1, wherein the method further comprises for at least one subpicture:

encoding in the bitstream an information indicating a conformance window for the subpicture.

8. The method of claim 1, wherein when the value of the second flag is 1, the value of the third flag is inferred to be 0 and the value of the fourth flag is inferred to be 1, wherein the third flag, having the value of 0, indicates that the in-loop filtering operations are not performed across boundaries of the given subpicture, and wherein the fourth flag, having the value of 1, indicates that the given subpicture is treated as a picture in the decoding process excluding in-loop filtering operations.

9. The method of claim 1, wherein the third flag is a loop filter across subpic enabled flag, and the fourth flag is a subpic treated as pic flag.

10. The method of claim 1, wherein when the value of the second flag is equal to 1, subpicture boundaries of the subpictures are treated as picture boundaries.

11. A method of decoding a bitstream of video data comprising pictures, pictures being divided into subpictures each including one or more slices, the method comprising:

decoding, from a sequence parameter set of the bitstream, a first flag indicating whether information of a subpicture is present;

when a value of the first flag is 1, decoding, from the sequence parameter set of the bitstream, a second flag related to a constraint of subpictures;

when a value of the second flag is 0, decoding, for a given subpicture in a picture, a third flag and a fourth flag from the sequence parameter set of the bitstream, the third flag indicating whether in-loop filtering operations across subpicture boundaries is enabled, and the fourth flag indicating whether the given subpicture is treated as a picture in decoding process excluding in-loop filtering operations, wherein the third flag and the fourth flag are not decoded from the sequence parameter set of the bitstream when the value of the second flag is 1; and decoding the bitstream at least based on the first flag, wherein information for specifying a width of a subpicture is capable of being decoded from the sequence parameter set.

12. The method of claim 11, wherein the method comprises:

when the value of the second flag is 1, all the subpictures have boundaries constrained as picture boundaries and there is no loop filtering across the subpicture boundaries.

13. The method of claim 11, wherein the second flag is related to all the subpictures.

14. The method of claim 11, wherein when the value of the second flag is 1, the value of the third flag is inferred to be 0 and the value of the fourth flag is inferred to be 1, wherein the third flag, having the value of 0, indicates that the in-loop filtering operations are not performed across boundaries of the given subpicture, and wherein the fourth flag, having the value of 1, indicates that the given subpicture is treated as a picture in the decoding process excluding in-loop filtering operations.

15. The method of claim 11, wherein the third flag is a loop filter across subpic enabled flag, and the fourth flag is a subpic treated as pic flag.

16. The method of claim 11, wherein when the value of the second flag is equal to 1, subpicture boundaries of the subpictures are treated as picture boundaries.

17. A device for encoding video data comprising pictures into a bitstream, pictures being divided into subpictures each including one or more slices, the device comprising a processor configured to execute:

encoding, in a sequence parameter set of the bitstream, a first flag indicating whether information of a subpicture is present;

when a value of the first flag is 1, encoding, in the sequence parameter set of the bitstream, a second flag related to a constraint of subpictures;

when a value of the second flag is 0, encoding, for a given subpicture in a picture, a third flag and a fourth flag in the sequence parameter set of the bitstream, the third flag indicating whether in-loop filtering operations across subpicture boundaries is enabled and the fourth flag indicating whether the given subpicture is treated as a picture in decoding process excluding in-loop filtering operations, wherein the third flag and the fourth flag are not encoded in the sequence parameter set of the bitstream when the value of the second flag is 1; and encoding coding tree blocks composing the pictures into the bitstream, wherein information for specifying a width of a subpicture is capable of being encoded in the sequence parameter set.

18. A device for decoding a bitstream of video data comprising pictures, pictures being divided into subpictures each including one or more slices, the devices comprising a processor configured for:

decoding, from a sequence parameter set of the bitstream, a first flag indicating whether information of a subpicture is present;

when a value of the first flag is 1, decoding, from the sequence parameter set of the bitstream, a second flag related to a constraint of subpictures;

when a value of the second flag is 0, decoding, for a given subpicture in a picture, a third flag and a fourth flag from the sequence parameter set of the bitstream, the third flag indicating whether in-loop filtering operations across subpicture boundaries is enabled, and the fourth flag indicating whether the given subpicture is treated as a picture in decoding process excluding in-loop filtering operations, wherein the third flag and the fourth flag are not decoded from the sequence parameter set of the bitstream when the value of the second flag is 1; and decoding the bitstream at least based on the first flag, wherein information for specifying a width of a subpicture is capable of being decoded from the sequence parameter set.

19. A non-transitory computer-readable storage medium storing instructions of a computer program for implementing a method, the method comprising:

encoding, in a sequence parameter set of the bitstream, a first flag indicating whether information of a subpicture is present;

when a value of the first flag is 1, encoding, in the sequence parameter set of the bitstream, a second flag related to a constraint of subpictures;

when a value of the second flag is 0, encoding, for a given subpicture in a picture, a third flag and a fourth flag in the sequence parameter set of the bitstream, the third flag indicating whether in-loop filtering operations across subpicture boundaries is enabled and the fourth flag indicating whether the given subpicture is treated as a picture in decoding process excluding in-loop filtering operations, wherein the third flag and the fourth flag are not encoded in the sequence parameter set of the bitstream when the value of the second flag is 1; and encoding coding tree blocks composing the pictures into the bitstream, wherein information for specifying a width of a subpicture is capable of being encoded in the sequence parameter set.

20. A non-transitory computer-readable storage medium storing instructions of a computer program for implementing a method, the method comprising:

decoding, from a sequence parameter set of the bitstream, a first flag indicating whether information of a subpicture is present;

when a value of the first flag is 1, decoding, from the sequence parameter set of the bitstream, a second flag related to a constraint of subpictures;

when a value of the second flag is 0, decoding, for a given subpicture in a picture, a third flag and a fourth flag from the sequence parameter set of the bitstream, the third flag indicating whether in-loop filtering operations across subpicture boundaries is enabled, and the fourth flag indicating whether the given subpicture is treated as a picture in decoding process excluding in-loop filtering operations, wherein the third flag and the fourth flag are not decoded from the sequence parameter set of the bitstream when the value of the second flag is 1; and decoding the bitstream at least based on the first flag, wherein information for specifying a width of a subpicture is capable of being decoded from the sequence parameter set.

* * * * *